(12) United States Patent
Takenoshita et al.

(10) Patent No.: US 7,857,250 B2
(45) Date of Patent: Dec. 28, 2010

(54) RECORDING TAPE CARTRIDGE AND ROTATION LOCKING STRUCTURE

(75) Inventors: Kenji Takenoshita, Kanagawa (JP); Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/509,486

(22) Filed: Jul. 27, 2009

(65) Prior Publication Data

US 2010/0059617 A1 Mar. 11, 2010

(30) Foreign Application Priority Data

Sep. 5, 2008 (JP) ............................. 2008-227999

(51) Int. Cl.
*G03B 23/02* (2006.01)
(52) U.S. Cl. .................... 242/338.1; 242/348
(58) Field of Classification Search ................ 242/338, 242/338.1, 343, 348; 360/132
See application file for complete search history.

(56) References Cited

U.S. PATENT DOCUMENTS 6,452,747 B1 * 9/2002 Johnson et al. ............. 360/132

| | | | | |
|---|---|---|---|---|
| 6,650,504 B2 * | 11/2003 | Ridl | ............................ | 360/132 |
| 7,448,569 B2 * | 11/2008 | Sasaki et al. | ............. | 242/338.1 |
| 7,677,488 B2 * | 3/2010 | Hiraguchi | ................ | 242/338.1 |
| 2005/0211813 A1 * | 9/2005 | Hiraguchi | ................ | 242/338.1 |
| 2007/0023556 A1 * | 2/2007 | Hiraguchi | ................... | 242/343 |

FOREIGN PATENT DOCUMENTS

JP 2005-196938 A 7/2005
JP 2005-276415 A 10/2005

* cited by examiner

*Primary Examiner*—William A Rivera
(74) *Attorney, Agent, or Firm*—Solaris Intellectual Property Group, PLLC

(57) ABSTRACT

A recording tape cartridge includes a reel, a case where the reel is accommodated, an engagement gear that is provided in the reel, and a brake gear which is provided in the case side brake member and in which a mesh state with the engagement gear or a mesh release state with the engagement gear is switched by relative displacement of an axis line direction of the brake member with respect to the reel. In a piece taper tooth of the engagement gear, a mesh surface that is oriented in a winding rotation direction is approximately parallel to a reel axis line direction and an opposite mesh surface is inclined with respect to the reel axis line. A piece taper tooth of the brake gear is a taper tooth that is opposite to the piece taper tooth of the engagement gear.

14 Claims, 13 Drawing Sheets

RECORDING TAPE CARTRIDGE AND ROTATION LOCKING STRUCTURE

CROSS-REFERENCE TO RELATED APPLICATION

This application claims priority under 35 USC 119 from Japanese Patent Application No. 2008-227999 filed on Sep. 5, 2008, the disclosure of which is incorporated by reference herein.

BACKGROUND OF THE INVENTION

1. Field of the Invention

The present invention relates to a recording tape cartridge which rotatably accommodates, within a case, a reel around which a recording tape, such as a magnetic tape or the like, is wound.

2. Related Art

A recording tape cartridge where a brake gear that is formed on an outer circumference of a brake member not to be rotated with respect to a case is meshed with an engagement gear that is formed on an inner circumference of a reel hub and the rotation of the reel with respect to the case is locked has been known (for example, refer to Japanese Patent Application Laid-Open No. 2005-196938). Further, a recording tape cartridge where a locking member is entered between a reel and case ceiling plate and displacement of the reel with respect to the case in an axis line direction is regulated has been known (for example, refer to Japanese Patent Application Laid-Open No. 2005-276415).

Meanwhile, when the recording tape cartridge falls to a floor, the reel may be displaced to be inclined with respect to the case due to the impact. Even in this case, a brake member where a displacement direction is regulated in only an upward-to-downward direction (in general, reel axis line direction) with respect to the case is rarely inclined with respect to the case and is relatively inclined with respect to the reel.

However, in the related art, due to the relative posture variation (inclination) of the brake member with respect to the reel at the time of falling, a rotation lock state of the reel by the brake member may be released. Further, as disclosed in Japanese Patent Application Laid-Open No. 2005-196938, when a mesh surface of the engagement gear and the brake gear is set to be parallel to a reel axis line, a taper for guidance at the time of the mesh cannot be formed in only an end of a teeth width direction. Therefore, in order to smoothly mesh the engagement gear and the brake gear by the relative displacement of the reel axis line direction, high precision is required in components and an assembly. Specifically, when a guide taper that is sufficient to smoothly mesh the engagement gear and the brake gear within a limited mesh stroke is provided, a mesh area that is approximately parallel to the reel axis line may be decreased, and a rotation lock state by the brake member may be released at the time of falling. In contrast, when a guide taper amount is decreased to secure a sufficient mesh surface, it is difficult to smoothly mesh the engagement gear and the brake gear. In order to achieve the smooth mesh of the engagement gear and the brake gear within the limited stroke and maintaining of the lock state with respect to the posture variation of the brake member at the time of falling, the high precision is required in the components and the assembly, as described above.

SUMMARY OF THE INVENTION

Accordingly, the present invention has been made to solve the above-described problems, and it is an object of the present invention to provide a recording tape cartridge that can smoothly mesh a reel side gear and a case side gear and prevent a reel from rotating in a recording tape wound direction with respect to a case in accordance with falling, and a rotation locking structure that can smoothly mesh a rotation body side gear and a base side gear and effectively lock rotation of the rotation body with respect to the base portion.

A recording tape cartridge according to a first aspect of the present invention includes: a reel around which a recording tape is wound; a case in which the reel is accommodated such that the reel is rotatable around a reel axis line; a reel side gear provided in the reel, that is configured to include a plurality of piece taper teeth, in each of which a first mesh surface oriented in a rotation direction of the reel when the recording tape is wound is substantially parallel to the reel axis line direction and a second mesh surface oriented in a rotation direction of the reel when the recording tape is pulled out is inclined with respect to the reel axis line direction, the plurality of piece taper teeth of the reel side gear being arranged in the reel along a circumference which is coaxial with the reel; a case side gear provided in the case or a brake member which is supported so as not to be able to rotate with respect to the case, that is configured to include a plurality of piece taper teeth formed to be able to mesh with the piece taper teeth of the reel side gear, the plurality of piece taper teeth of the case side gear being arranged in the case or the brake member along a circumference which is coaxial with the reel, and a mesh state of the reel side gear and the case side gear and a mesh release state of the reel side gear and the case side gear being able to be acquired by the case or the brake member and the reel being relatively moved in the reel axis line direction; and a mesh holding section that maintains the mesh state of the reel side gear and the case side gear when the recording tape is not in use.

In the recording tape cartridge according to the first aspect of the present invention, when the recording tape is not used, for example, when the recording tape is stored or carried, the mesh of the reel side gear and the case side gear is maintained by the mesh holding section. Therefore, the relative rotation of the reel with respect to the case is locked.

In this case, in the recording tape cartridge, the first mesh surface (hereinafter, referred to as a "winding mesh surface") in the piece taper tooth constituting the reel side gear, that is oriented in a rotation direction (hereinafter, referred to as a "winding direction") of when the reel winds the recording tape is approximately parallel to the reel axis line direction. In the mesh state, if the reel rotates in the winding direction, the winding mesh surface is engaged with a mesh surface, that is approximately parallel to the reel axis line direction, in the piece taper tooth of the case side gear. For this reason, the rotation force of the reel in the winding direction is not converted into the movement force in the reel axis line (thrust) direction, that is, the mesh release direction (force of the mesh release direction is significantly small). For this reason, for example, even though the reel rotates in the winding direction when the falling of the recording tape cartridge, it is possible to prevent or effectively suppress the mesh of the reel side gear and the case side gear from being released by the rotation. That is, the rotation of the reel in the winding direction is prevented.

As such, in the recording tape cartridge according to the first aspect of the present invention, it is possible to prevent the reel from rotating in the recording tape wind direction with respect to the case when falling. Further, in the recording tape cartridge, since one of the mesh surfaces in the piece taper teeth in each of the reel side gear and the case side gear is a taper surface that is inclined with respect to the reel axis line, the reel side gear and the case side gear are guided in the circumferential direction in the taper surfaces and are smoothly meshed with each other.

Further, it is preferable that each of the plurality of piece taper teeth of the case side gear is configured such that a first mesh surface oriented in the rotation direction of the reel when the recording tape is pulled out is substantially parallel to the reel axis line direction and a second mesh surface oriented in the rotation direction of the reel when the recording tape is wound is inclined with respect to the reel axis line direction.

Further, it is preferable that the first mesh surface and the second mesh surface of the plurality of piece taper teeth of the case side gear can be respectively meshed with the first mesh surface and the second mesh surface of the plurality of piece taper teeth of the reel side gear.

In the recording tape cartridge according to the second aspect of the present invention in the tape cartridge described in the first aspect, the reel side gear further includes a plurality of inverse piece taper teeth, in each of which a first mesh surface oriented in the rotation direction of the reel when the recording tape is pulled out is substantially parallel to the reel axis line direction and a second mesh surface oriented in the rotation direction of the reel when the recording tape is wound is inclined with respect to the reel axis line direction, the plurality of inverse piece taper teeth of the reel side gear being arranged in the reel along a circumference which is coaxial with the reel, the case side gear further includes a plurality of inverse piece taper teeth that is formed to be able to mesh with the inverse piece taper teeth of the reel side gear and arranged in the case or the brake member along a circumference which is coaxial with the reel, and in the mesh state, the piece taper teeth of the case side gear and the inverse piece taper teeth of the case side gear, and the piece taper teeth of the reel side gear and the inverse piece taper teeth of the reel side gear are respectively meshed with each other, and in the mesh release state, the meshing states of the piece taper teeth of the case side gear and the inverse piece taper teeth of the case side gear, and the piece taper teeth of the reel side gear and the inverse piece taper teeth of the reel side gear are respectively released.

In the recording tape cartridge according to the second aspect of the present invention, when the recording tape is not used, the piece taper teeth of the reel side gear and the piece taper teeth of the case side gear are meshed with each other, and the inverse piece taper teeth of the reel side gear and the inverse piece taper teeth of the case side gear are meshed with each other. For this reason, even though the reel rotates in any one of the winding direction or the pull out (drawing) direction opposite to the winding direction, the rotation force is not converted into the movement force of the reel axis line (thrust) direction, that is, the mesh release direction (force of the release direction is significantly small). That is, in the recording tape cartridge, it is possible to effectively prevent the reel from rotating with respect to the case, at the time of falling. Meanwhile, when the case side gear and the reel side gear are meshed with each other, the respective taper surfaces are guided in the circumferential direction and the case side gear and the reel side gear are easily meshed with each other.

Further, it is preferable that each of the plurality of inverse piece taper teeth of the case side gear is configured such that a first mesh surface oriented in the rotation direction of the reel when the recording tape is wound is substantially parallel to the reel axis line direction and a second mesh surface oriented in the rotation direction of the reel when the recording tape is pulled out is inclined with respect to the reel axis line direction.

Further, it is preferable that the first mesh surface and the second mesh surface of the plurality of inverse piece taper teeth of the case side gear can be respectively meshed with the first mesh surface and the second mesh surface of the plurality of inverse piece taper teeth of the reel side gear.

In the recording tape cartridge according to the third aspect of the present invention, in the tape cartridge described in the first and second aspects, in at least one of the reel or the case or the brake member, a taper portion is provided for centering the reel side gear with respect to the case side gear in accordance with relative movement of the reel and the brake member in a direction in which the case side gear and the reel side gear are meshed with each other.

In the recording tape cartridge according to the third aspect of the present invention, when the mesh release state of the reel side gear and the case side gear is switched into the mesh state, the reel side gear is centered relatively to the case side gear. Therefore, the case side gear is securely meshed with the reel side gear.

The recording tape cartridge according to the recording tape cartridge according to the fourth aspect of the present invention, in the tape cartridge described in the any one of the first to third aspect, the recording tape cartridge further includes a locking member that is entered between the case and the reel to regulate movement of the reel with respect to the case in the axis line direction when the recording tape is not in use.

In the recording tape cartridge according to the fourth aspect of the present invention, when the recording tape is not used, the movement of the reel with respect to the case in the axis line direction is regulated. Therefore, even when the recording tape cartridge falls, the inclination of the reel with respect to the case is suppressed. For this reason, in the recording tape cartridge, it is possible to prevent the reel from rotating in the recording tape wind direction with respect to the case when falling.

The recording tape cartridge according to the fifth aspect of the present invention, in the tape cartridge described in the any one of the first to fourth aspect, the recording tape cartridge further includes: a leader tape to one end of which a tip end of the recording tape is connected, and at the other end of which an operated portion, that is operated to be pulled out by a drive device for the recording tape cartridge when the recording tape is pulled out from an opening of the case, is provided within a range of a width of the recording tape; convex portions that extend outwardly in width-wise directions of the leader tape from the other end of the leader tape; and a slot portion that includes: a groove portion provided in the case to face the opening, in which the convex portions are entered slidably in the pull out direction of the recording tape with respect to the case; and a stopper portion which closes an inner side end of the case in the groove portion.

In the recording tape cartridge according to the fifth aspect of the present invention, when the recording tape is not used, a pair of convex portions that protrude from both sides in the width-wise direction at a free end as the other end of the leader tape where the one end is connected to the recording tape are entered into the groove portion of the slot portion of the case so as to be able to enter or exit from the side of the opening end (side of the opening for tape drawing). The ends of the convex portions are engaged with or adjacent to the stopper portion of the slot portion and the entrance to the further inner side of the case is regulated. Therefore, the leader tape is positioned at the predetermined location with respect to the case.

Here, in the recording tape cartridge, as described above, since the reel is prevented from rotating in the reel wound direction with respect to the case when falling, it is possible to prevent or effectively suppress the ends of the convex portions from being engaged with the stopper portion of the slot portion with the excessive force. As a result, it is possible to prevent the convex portions from overriding the stopper portion of the slot portion due to the deformation of the leader tape by the falling impact or the like. In addition, the positioning state of the leader tape with respect to the case is maintained. That is, falling or displacement of the leader tape with respect to the case from the predetermined position is prevented or effectively suppressed.

A rotation locking structure according to sixth aspect of the present invention includes: a base portion; a rotation body that is supported at the base portion to be rotatable around an axis line; a rotation body side gear provided at the rotation body, that is configured to include a plurality of piece taper teeth, in each of which a first mesh surface oriented in one rotation direction of the rotation body around the axis line is substantially parallel to the axis line direction and a second mesh surface oriented in the other rotation direction of the rotation body around the axis line is inclined with respect to the axis line direction, the plurality of piece taper teeth of the rotation body side gear being arranged at the rotation body along a circumference which is coaxial with the rotation body; and a base side gear provided in the base portion or a brake member which is supported so as not to be able to rotate with respect to the base portion, that is configured to include a plurality of piece taper teeth formed to be able to mesh with the piece taper teeth of the rotation body side gear, a mesh state of the rotation body side gear and the base side gear and a mesh release state of the rotation body side gear and the base side gear being able to be acquired by the base portion or the brake member and the rotation body being relatively moved in the axis line direction.

Further, it is preferable that the rotation body side gear further includes a plurality of inverse piece taper teeth, in each of which a first mesh surface oriented in the other rotation direction of the rotation body around the axis line is substantially parallel to the axis line direction and a second mesh surface oriented in the one rotation direction of the rotation body around the axis line is inclined with respect to the axis line direction, the plurality of inverse piece taper teeth of the rotation body side gear being arranged in the rotation body along a circumference which is coaxial with the rotation body and whose diameter is different from that of the circumference of the piece taper teeth of the rotation body side gear, the base side gear further includes a plurality of inverse piece taper teeth formed to be able to mesh with the inverse piece taper teeth of the rotation body side gear, and in the mesh state, the piece taper teeth of the base side gear and the inverse piece taper teeth of the base side gear, and the piece taper teeth of the rotation body side gear and the inverse piece taper teeth of the rotation body side gear are respectively meshed with each other, and in the mesh release state, the meshing states of the piece taper teeth of the base side gear and the inverse piece taper teeth of the base side gear, and the piece taper teeth of the rotation body side gear and the inverse piece taper teeth of the rotation body side gear are respectively released.

In the rotation locking structure according to sixth aspect of the present invention, by that the rotation body approaches or is away from the base portion or the brake member along the axis line direction, the mesh state of the rotation body side gear and the base side gear and the mesh release state of the rotation body side gear and the base side gear are switched. In this case, the piece taper teeth of the rotation side gear and the base side gear and the inverse taper teeth of the rotation side gear and the base side gear are meshed with each other. Therefore, in the mesh state, even though the rotation body rotates with respect to the base portion in any directions around the axis line, the mesh surfaces that are approximately parallel to the axis line are meshed with each other, an the rotation is stopped. That is, since the rotation force is not converted into the movement force of the axis line (thrust) direction, that is, the mesh release direction, the mesh of the rotation body side gear and the base side gear is maintained, and the rotation of the rotation body with respect to the base portion is effectively prevented.

As described above, in the recording tape cartridge according to the aspect of the present invention, the reel side gear and the case side gear are configured to include the piece taper teeth where two surfaces are provided, that is, the first mesh surface approximately parallel to the reel axis line and the inclined second mesh surface (taper surface) having a function of inviting the counterpart. Therefore, the taper amount that is needed to smoothly mesh the reel side gear and the case side gear can be sufficiently secured, and the mesh surface that is approximately parallel to the reel axis line can be sufficiently secured. As result, the reel side gear and the case side gear can be smoothly meshed with each other, and the reel can be prevented from rotating in the recording tape wind direction with respect to the case when falling.

Further, in the rotation locking structure according to the aspect of the present invention, the rotation body side gear and the base side gear are configured to include the piece taper teeth where two surfaces are provided, that is, the first mesh surface approximately parallel to the axis line and the inclined second mesh surface (taper surface) having a function of inviting the counterpart. Therefore, the taper amount that is needed to smoothly mesh the rotation body side gear and the base side gear can be sufficiently secured, and the mesh surface that is approximately parallel to the axis line can be sufficiently secured. As result, the rotation body side gear and the base side gear can be smoothly meshed with each other, and the rotation of the rotation body with respect to the base portion can be effectively locked.

BRIEF DESCRIPTION OF THE DRAWINGS

Exemplary embodiments of the invention will be described in detail with reference to the following figures, wherein.

DESCRIPTION OF THE INVENTION

A recording tape cartridge 10 relating to a first exemplary embodiment of the present invention will be described on the basis of FIGS. 1 through 10. For convenience of explanation, the direction of loading the recording tape cartridge 10 into a drive device (the direction of arrow A shown for convenience in FIG. 1 and the like) is the front direction, and the directions of arrow B and arrow C, which are respectively perpendicular to arrow A, are the left direction and the top direction, respectively.

Schematic Structure of Recording Tape Cartridge

Figure 1:
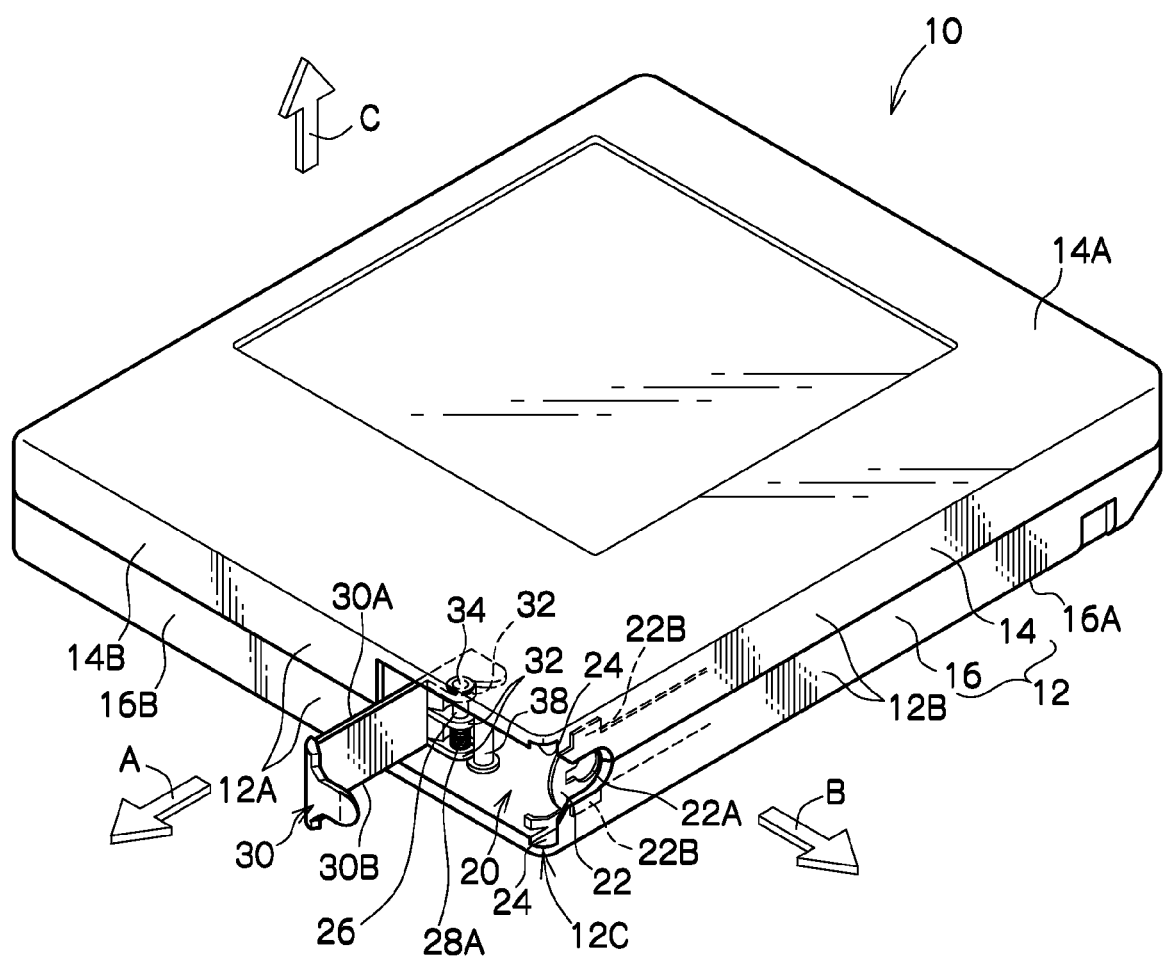
FIG. 1 is a schematic perspective view illustrating a recording tape cartridge according to a first embodiment of the present invention.
Figure 2:
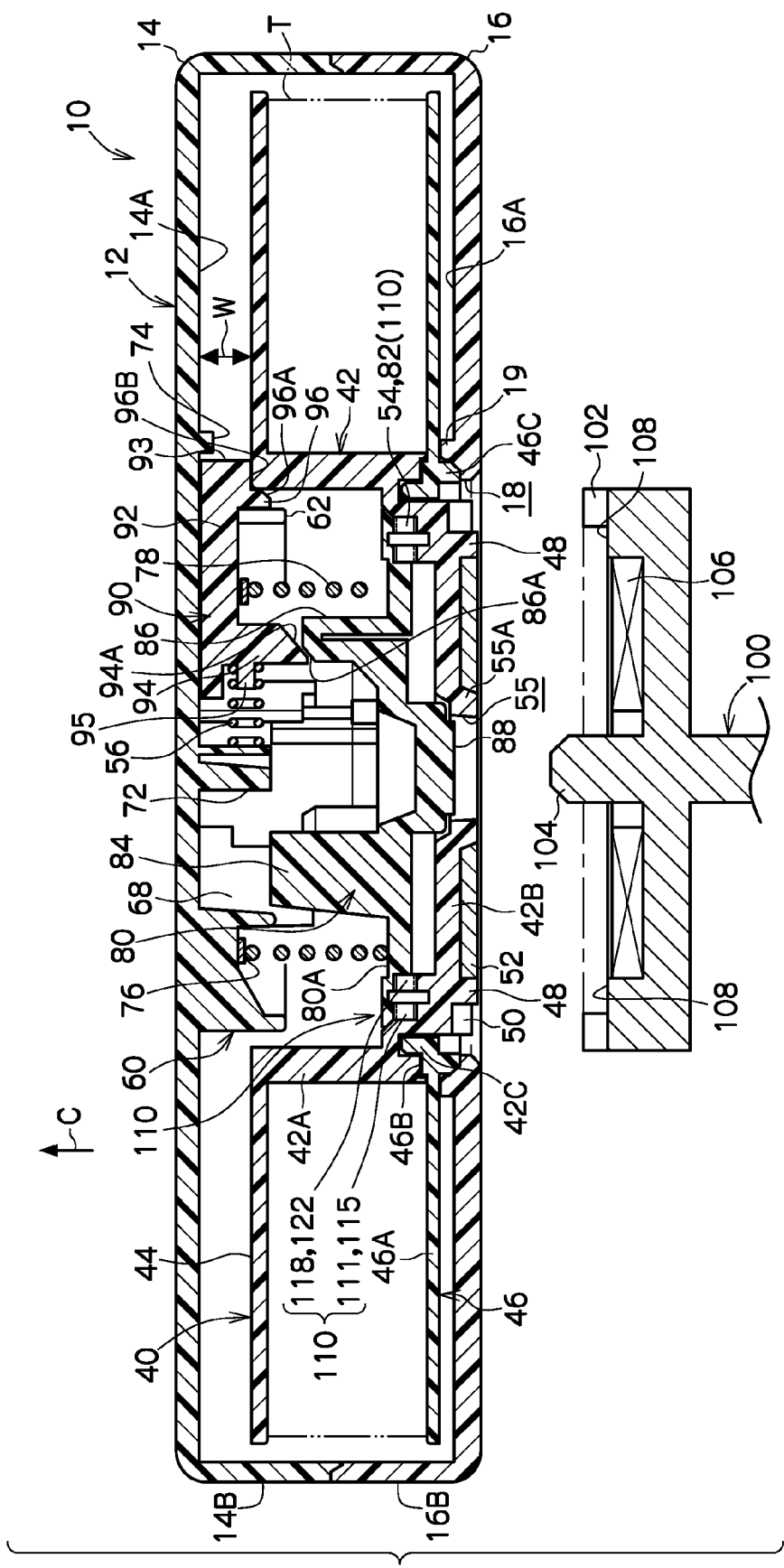
FIG. 2 is a lateral cross-sectional view illustrating a non-utilization state of a recording tape cartridge according to a first embodiment of the present invention.
Figure 3:
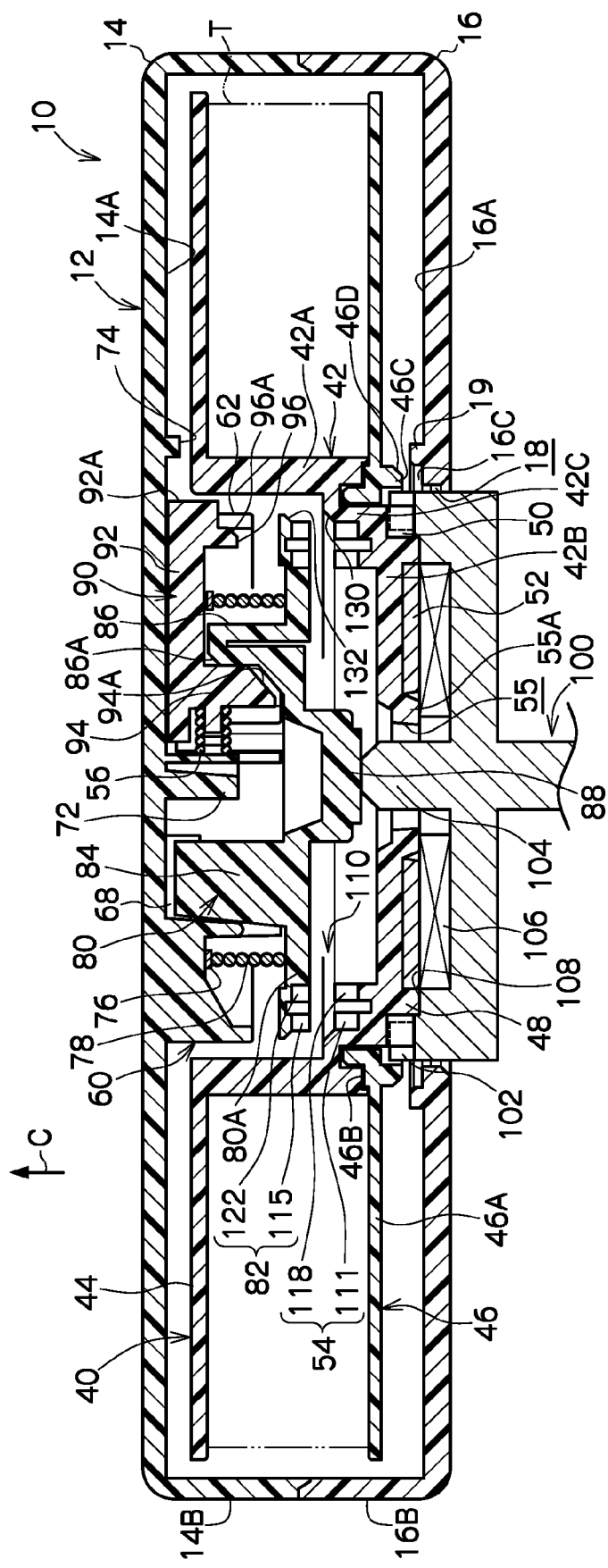
FIG. 3 is a later cross-sectional view illustrating a reel rotation state of a recording tape cartridge according to a first embodiment of the present invention.

The exterior of the recording tape cartridge 10 is illustrated in a perspective view in FIG. 1. Sectional views at the time when the recording tape cartridge 10 is not in use and is being used are shown in FIGS. 2 and 3, respectively. As shown in these drawings, the recording tape cartridge 10 has a case 12. The case 12 is structured by an upper case 14 and a lower case 16 being joined together.

Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor (bottom) plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

As shown in FIG. 2, a reel 40, which will be described in detail later, is rotatably accommodated within the case 12. Only one reel 40 is provided. A magnetic tape T serving as a recording tape is wound on the reel 40. A leader tape 22 serving as a leader member is provided at the distal end of the magnetic tape T. A gear opening 18, which is for the rotating and driving of the reel 40 from the exterior, is provided in the floor plate 16A of the case 12. The structure around the gear opening 18 will be described later together with the reel 40.

An opening 20, which is for the pulling-out to the exterior of the magnetic tape T wound on the reel 40, is formed in a vicinity of a front left corner portion 12C which is the border portion between a front wall 12A (the forwardly-facing wall of the case 12 structured by the peripheral wall 14B and the peripheral wall 16B) and a left side wall 12B (the leftwardly-facing wall of the case 12 structured by the peripheral wall 14B and the peripheral wall 16B) of the case 12. The opening 20 is formed so as to extend over respective portions of the front wall 12A and the left side wall 12B which are adjacent to the corner portion 12C. The leader tape 22, which is fixed to an end portion of the magnetic tape T and is disposed along the left side wall 12B, is pulled-out from the opening 20.

The leader tape 22 is a pulled-out member with which a pull-out member (not illustrated) of a drive device engages in order to pull-out the magnetic tape T. The leader tape 22 is a tape-shaped member which has substantially the same width as the magnetic tape T and higher strength than the magnetic tape T. A hole 22A, with which the pull-out member engages, is formed in a vicinity of the distal end of the leader tape 22. Jutting portions (extending portions) 22B, which jut-out at the transverse (vertical) direction both sides, are formed at the top and bottom sides of the leader tape 22 at a region which is slightly more rearward than the distal end of the hole 22A.

Figure 9:
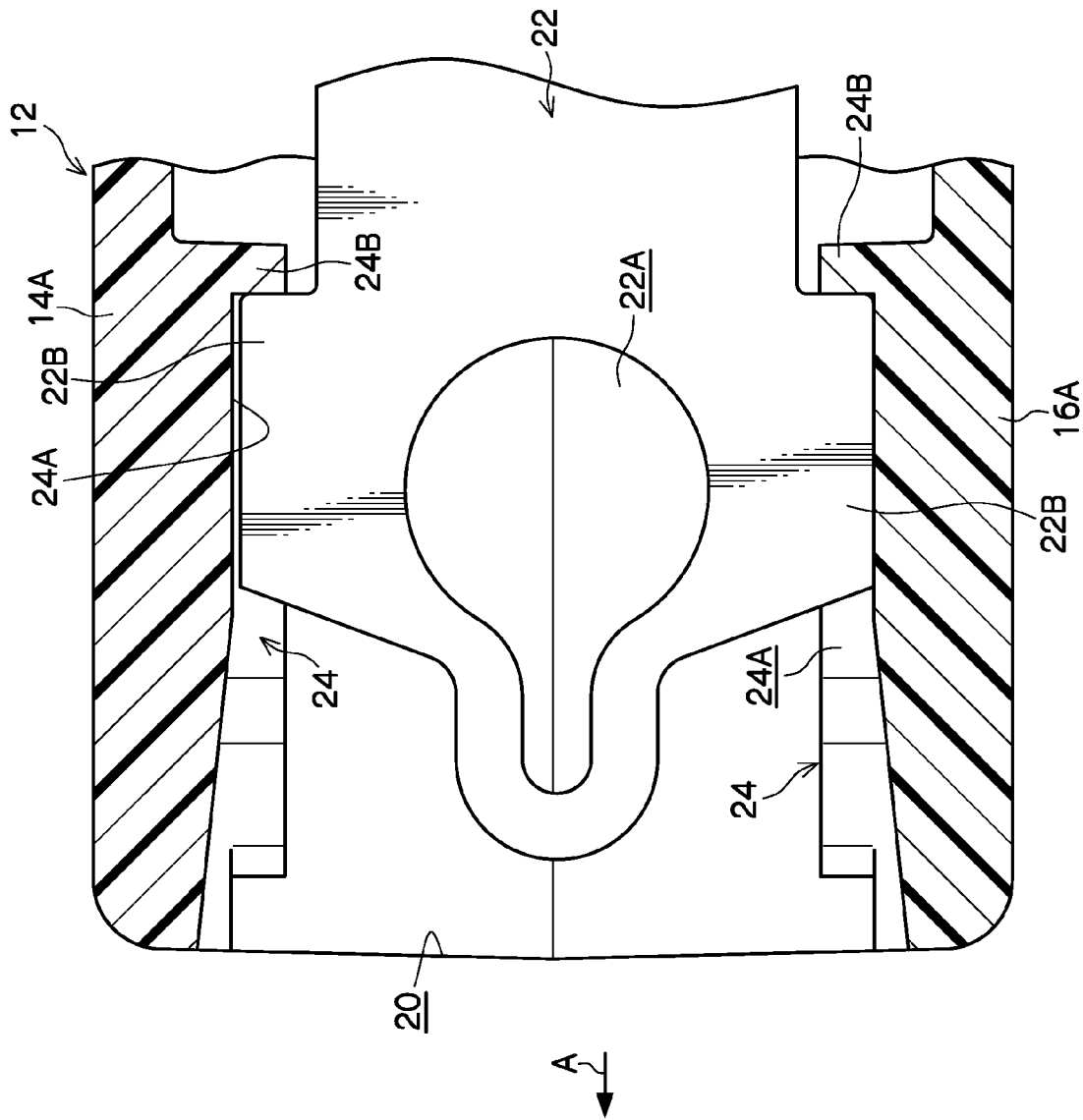
FIG. 9 is a lateral cross-sectional view illustrating a holding state with respect to a case of a leader tape that constitutes a recording tape cartridge according to a first embodiment of the present invention.

The jetting portions 22B are accommodated in (inserted) in slot portions 24 that are formed in an inner surface of the upper case 14 and an inner surface of the lower case 16, and the leader tape 22 is held in the case 12. As shown in FIG. 9, the slot portion 24 has a groove portion 24A that extends in a forward-to-backward longitudinal direction and is opened forwardly, and a stopper wall 24B that serves a stopper portion to regulate the movement of the jetting portion 22B accommodated in the groove portion 24A further toward an inner portion (a rear side) of the case.

When the recording tape cartridge 10 is not in use, the opening 20 is closed by a door 30. The door 30 is formed in a substantial "L" shape as seen in plan view, of substantially the same configuration and size as the opening 20. It is preferable that the door 30 be molded from an olefin resin such as POM (polyacetal) or the like. However, the door 30 may be molded from a resin such as PC (polycarbonate) or the like, or a metal such as SUS (stainless steel) or the like. The opening 20 is closed due to the door 30 rotating with, as the fulcrum of rotation thereof, a supporting shaft 26 which projects at the front wall 12A sides of the upper case 14 and the lower case 16, respectively.

Three, flat-plate-shaped rotating sliding portions 32 project in parallel from the inner surface of the door 30 in a vicinity of the right end portion (a position which is shifted by a predetermined distance toward the left from the right end portion). These rotating sliding portions 32 respectively project from the top and bottom both end portions of the inner surface of the door 30, and from an intermediate portion which is slightly below the center. Through holes, in which the supporting shaft 26 is fit with play, are formed in the rotating sliding portions 32 respectively. Accordingly, the door 30 is supported rotatably by the supporting shaft 26 being inserted through the through holes.

Annular convex portions 34 are formed around the through holes at the top surface of the rotating sliding portion 32 at the upper end portion, and at the bottom surface of the rotating sliding portion 32 of the lower end portion, respectively. Due to the annular convex portions 34 contacting the ceiling plate 14A and the floor plate 16A, a clearance of about 0.3 mm to 0.5 mm is formed between a top end surface 30A of the door 30 and the ceiling plate 14A, and between a bottom end surface 30B of the door 30 and the floor plate 16A, respectively. The sliding resistance between the case 12 and the door 30 is thereby reduced. The door 30 is structured so as to rotate in the direction of opening the opening 20, due to the portion of the door 30, which portion is further toward the right than the supporting shaft 26, being pushed by an opening/closing member of a drive device.

The supporting shaft 26 is inserted through a wound portion of a torsion spring 28 which always urges the door 30 in the direction of closing the opening 20. Namely, in the state of being held between the rotating sliding portion 32 at the lower end portion and the rotating sliding portion 32 at the intermediate portion, the wound portion of the torsion spring 28 is fit on and attached to the boss 26B whose diameter is small. One end portion side of the torsion spring 28 is anchored on a screw boss 38 of the case 12 (a screw boss which projects at the lower case 16). The other end portion side of the torsion spring 28 is anchored on the right side portion of the rotating sliding portion 32 in the door 30.

In this way, when the recording tape cartridge 10 is not in use, the door 30 closes the opening 20 due to the urging force of the torsion spring 28. When the portion of the door 30 further toward the right than the supporting shaft 26 is pushed by the opening/closing member as the recording tape cartridge 10 is loaded into a drive device, the door 30 rotates against the urging force of the torsion spring 28, and opens the opening 20.

Structure of Reel and the Like

Figure 8:
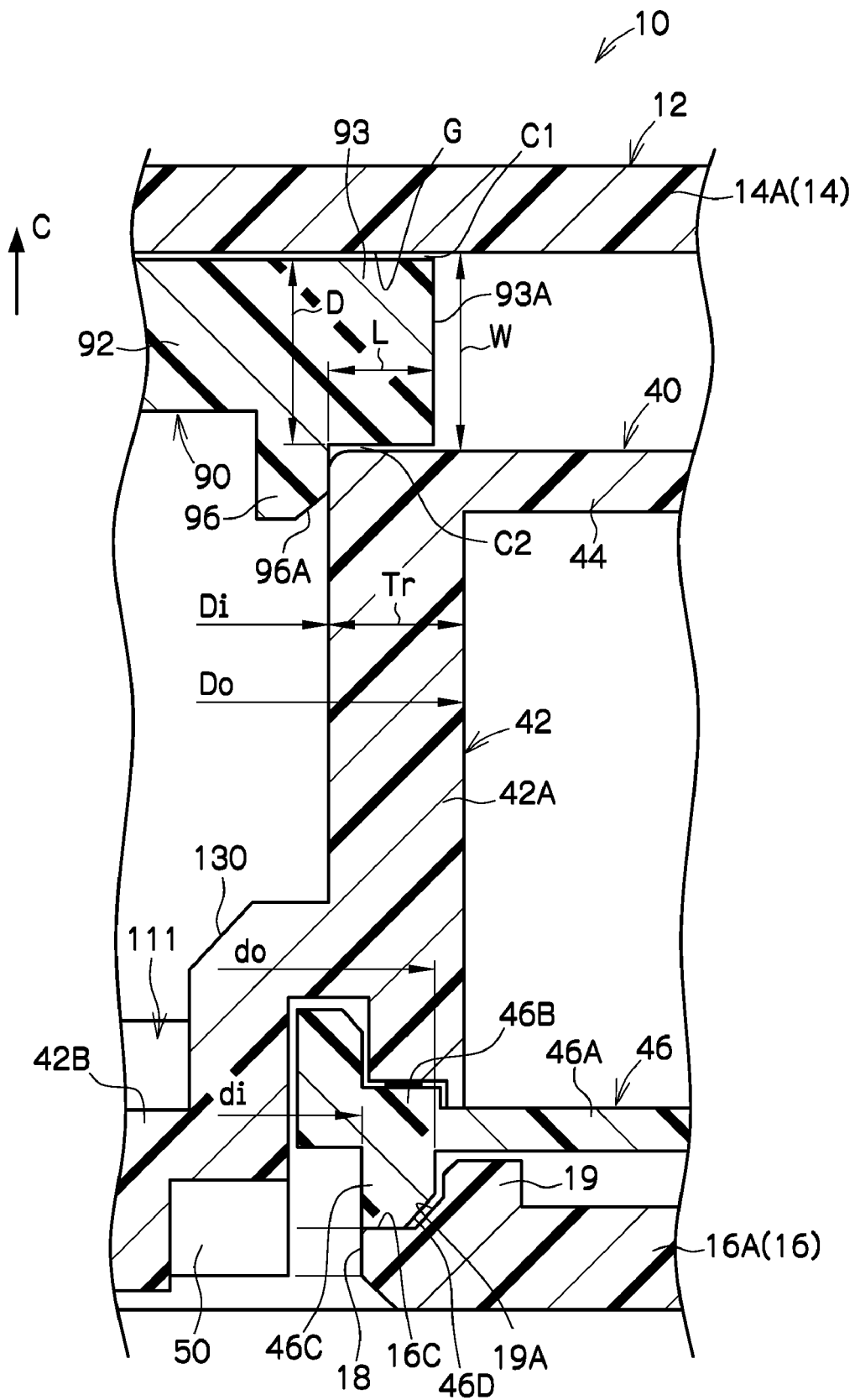
FIG. 8 is an enlarged cross-sectional view illustrating a movement regulation state of a reel that constitutes a recording tape cartridge according to a first embodiment of the present invention in an axis line direction.

Next, the reel 40 will be described. As shown in FIG. 8, the reel 40 has a reel hub 42 which structures the axially central portion of the reel 40. The reel hub 42 has a cylindrical tube portion 42A which serves as the "hub" in the present invention, and around whose outer periphery the magnetic tape T is wound. The reel hub 42 has a floor (bottom) plate portion 42B which is substantially disc-shaped, and an inner cylindrical tube portion 42C which is substantially shaped as a short, hollow cylinder and which connects the inner periphery of the lower portion of the cylindrical tube portion 42A with the outer peripheral portion of the floor plate portion 42B. A gap is formed between the inner cylindrical tube portion 42C and a vicinity of the lower end portion of the cylindrical tube portion 42A. The floor plate portion 42B is positioned so as to project further downward than the bottom end of the cylindrical tube portion 42A.

An upper flange 44 extends outwardly in the radial direction, integrally and coaxially from the open end (upper end) of the cylindrical tube portion 42A of the reel hub 42. By forming the upper flange 44 integrally with the open end side of the reel hub 42, the strength (rigidity) with respect to the winding of the magnetic tape T and the like is high. In the present embodiment, the top end surface of the cylindrical tube portion 42A and the top surface of the upper flange 44 are flush with one another.

A lower flange member 46 is joined, by ultrasonic welding or the like, to the bottom end portion of the cylindrical tube portion 42A. The lower flange member 46 is structured such that a lower flange 46A which corresponds to the upper flange 44, a welding portion 46B which is positioned at the radial direction inner side of the lower flange 46A and which is welded to the lower end of the cylindrical tube portion 42A of the reel hub 42, and an annular rib 46C which projects from the lower side of the welding portion 46B further downward than the bottom surface of the lower flange 46A, are formed coaxially.

As shown in FIG. 8, an inner diameter di of the annular rib 46C is formed to be larger than an inner diameter Di of the cylindrical tube portion 42A. An outer diameter do of the annular rib 46C is smaller than an outer diameter Do of the cylindrical tube portion 42A. Namely, the annular rib 46C is positioned within a range of a thickness tr (=(Do−Di)/2) of the cylindrical tube portion 42A along the radial direction, in the state in which the lower flange member 46 is welded to the bottom end surface of the cylindrical tube portion 42A at the welding portion 46B. The outer peripheral portion of the bottom end of the annular rib 46C is a taper surface 46D, and the outer diameter thereof is smaller than do.

Further, on the lower surface (an external surface) of the floor plate portion 42B of the reel hub 42, the reel gear 50 that is formed in an annular shape to be coaxial with the reel hub is formed. The reel gear 50 can be meshed with the driving gear 102 that is provided in the rotation shaft 100 of the drive device, by the relative movement of the axis direction. Further, from the inner side of the reel gear 50 in the bottom surface of the floor plate portion 42B, a reference convex portion 48 protrudes. The reference convex portion 48 is formed in an annular shape coaxial with the reel 40 and forms integrally with an inner end of the reel gear 50 in a radial direction. An end face of the reference convex portion 48 abuts a positioning surface 108 of the rotation shaft 100 and serves as a reference surface that determines a position of an axis direction of the reel 40 with respect to the drive device.

Meanwhile, inside the reel valve 42, as will be described below, a reel side gear 54 that constitutes a reel locking mechanism 110 together with a brake member 80 is provided. Further, in a axis center portion of the floor plate portion 42B, a through-hole 55 is provided. The through-hole 55 is used for an operation from the external portion of the brake member 80. In this embodiment, a release protrusion 104 of the rotation shaft 100 is fitted and performs a centering function at the time of rotation driving of the reel 40. For this reason, from an edge portion of the through-hole 55 in the floor plate portion 42B, a boss portion 55A protrudes downward and ensures a fitting length with the release protrusion 104. The lower end face of the boss portion 55A is at the approximately same location as the lower end face of the reference convex portion 48.

Portions, other than the lower flange member 46, of the above-described reel 40 are formed integrally by resin molding. A reel plate 52, which is disc-shaped and formed of a magnetic material and in which a hole is formed, is mounted coaxially to the bottom surface of the floor plate portion 42B, between the reference convex portion 48 and the boss portion 55A. The reel plate 52 is fixed to the floor plate portion 42B by insert molding or caulking. The bottom surface of the reel plate 52 is positioned further upward than the lower end surface of the reference convex portion 48. The reel plate 52 is attracted and held by the magnetic force of a magnet 106 of the rotating shaft 100, without contacting the magnet 106.

As shown in FIG. 2, when the reel 40, which is structured as described above, is accommodated within the case 12 and is not being used, the reel gear 50, the lower end surface of the reference convex portion 48, the reel plate 52, and the like are exposed to the exterior from the gear opening 18. Specifics thereof will be described hereinafter.

The inner diameter of the gear opening 18 of the case 12 is substantially the same as the inner diameter of the annular rib 46C, and is larger than the outer diameter of the floor plate portion 42B of the reel 40. When the reel 40 is not being used, the bottom end surface of the annular rib 46C abuts the inner surface (top surface) of the floor plate 16A around the gear opening 18, and the floor plate portion 42B is disposed in the gear opening 18. Namely, when the reel 40 is not being used, the reel 40 is shifted toward the floor plate 16 side of the case 12. The position of the reel 40 at this time is called the lowermost position thereof. Note that the dimensions of the respective portions of the reel 40 are determined such that the respective portions of the reel 40 which is positioned at the lowermost position do not project further downward than the outer surface (bottom surface) of the floor plate 16A.

In the state in which the reel 40 is positioned at the lowermost position, a gap G (see FIG. 8), whose length along the axial direction of the reel 40 is W, exists between the ceiling plate 14A and the top end surface of the cylindrical tube portion 42A forming the top end of the reel 40 (i.e., the top surface of the upper flange 44). When the reel 40 is driven to rotate by the rotating shaft 100, as shown in FIG. 3, the reel 40 rises up within the case 12, and rotates without contacting the respective portions of the case 12. The position of the reel 40 at this time is called the raised position.

Further, from the inner surface of the gear opening 18 in the bottom plate 16A at the outside of the radial direction, an annular rib 19 protrudes coaxially from the gear opening 18. The annular rib 19 has an inner diameter that is slightly large than an outer diameter of the annular rib 46C. In the annular rib 19, the protrusion height from the bottom plate 16A is slightly smaller than the protrusion height from the lower flange 46A of the annular rib 46C. Further, a base portion of the annular rib 19 at the inner surface side becomes a taper surface 19A that approximately corresponds to the taper surface 46D of the annular rib 46C. Hereinafter, an inner portion in a radial direction more than (the taper surface 19A of) the annular rib 19 in the inner surface of the bottom plate 16A, that is, an annular portion where the lower end face of the annular rib 46C abuts at the time of non-use is called an abutment surface 16C.

The annular rib 19 is structured such that, in the state in which the reel 40 is positioned at its lowermost position (the bottom end surface of the annular rib 46C abuts the abutment surface 16C) and the reel 40 is centered, both the inner surface and the top end surface of the annular rib 19, including the taper surface 19A thereof, do not contact the respective portions of the reel 40. If the reel 40 attempts to become centrally shifted, the annular rib 19 interferes with the annular rib 46C so as to prevent such central shifted. Further, at the time when the reel 40 returns from its raised position to its lowermost position, the taper surface 46D of the reel 40 functions to guide the reel 40 in at the inner side of the annular rib 19.

Configuration of a Reel Locking Section

In the reel 40 that is described above, at a time of non-use, the rotation with respect to the case 2 is locked by the reel locking mechanism 110. Specifically, the reel locking mechanism 110 locks the rotation with respect to the case 12, by that the case side gear 82 serving as the case side gear that is formed in the brake member 80 is meshed with the reel side gear 54 serving as the reel side gear that is formed in the reel hub 42. First, the configuration for the rotation lock of the reel 40 with respect to the case 12 by the brake member 80 and the lock release thereof are described, and the shapes of the reel side gear 54 and the case side gear 82 are described.

Figure 4:
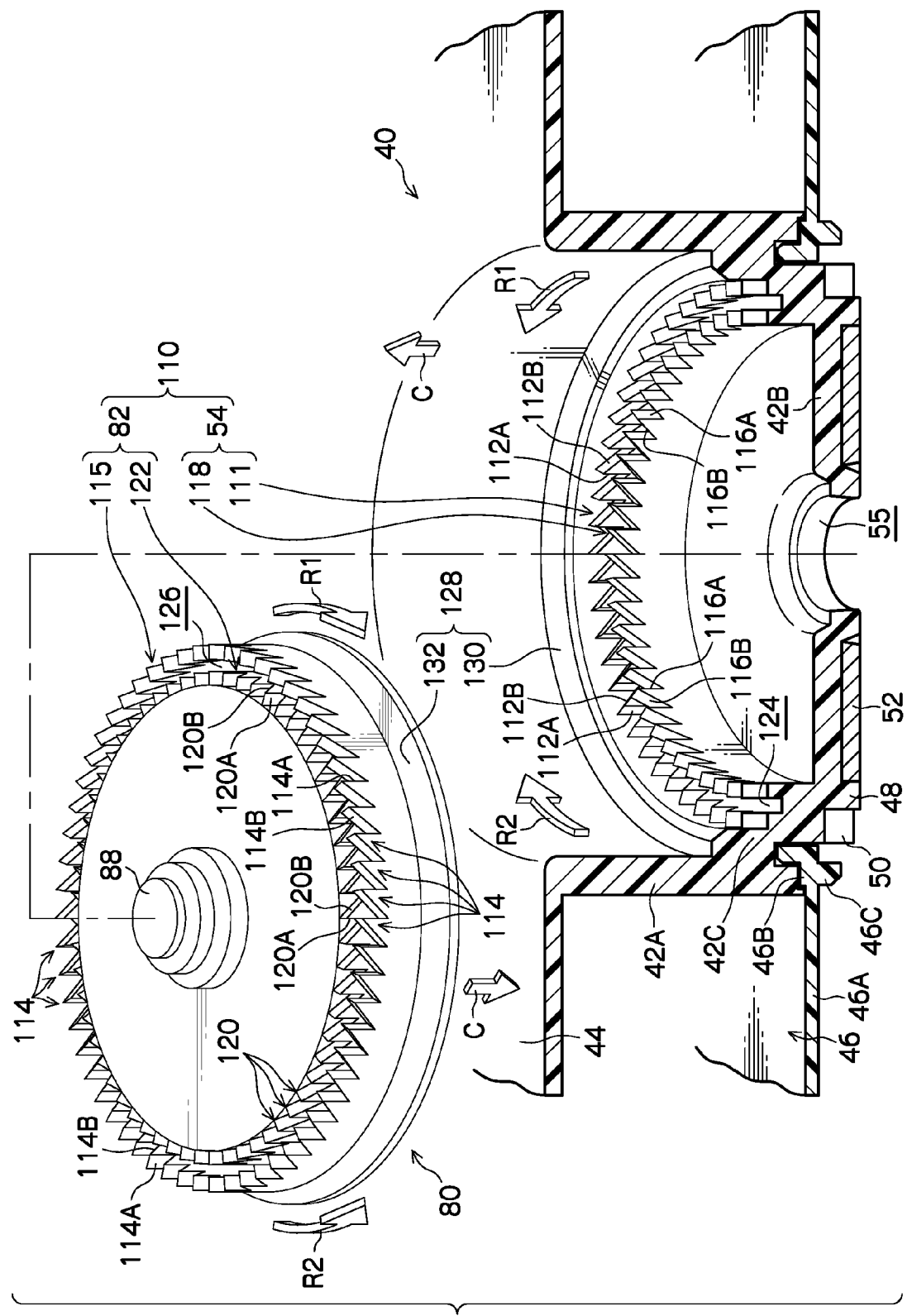
FIG. 4 is a partially cut perspective view illustrating a reel locking section that constitutes a recording tape cartridge according to a first embodiment of the present invention.

As shown in FIGS. 2 through 4, the recording tape cartridge 10 has the braking member 80 which impedes rotation of the reel 40 with respect to the case 12. The braking member 80 is formed in the shape of a disc. The case side gear 82, which can mesh with the reel side gear 54 of the reel 40, is formed at the outer peripheral portion of the braking member 80. The braking member 80 is inserted in the cylindrical tube portion 42A of the reel hub 42 substantially coaxially and so as to be movable in the vertical (axial) direction.

From the top surface of the brake member 80, plural (three in this embodiment) guide pieces 84 protrude in a radial manner in plan view. Each guide piece is inserted between the guide walls 68 (which will be described in detail below) of the case 12 and the brake member 80 is supported such that it cannot rotate with respect to the case 12. Further, each guide piece 84 is guided in an upward-to-backward direction by section of the guide walls 68. That is, the brake member 80 is configured such that relative displacement in only an upward-to-backward direction (axis direction of the reel 40) with respect to the case 12 is allowed by the plural guide pieces 84 and guide walls 68. The plural guide pieces 84 and guide walls 68 correspond to the guide section in the present invention.

In addition, the brake member 80 obtains a rotation lock position (refer to FIG. 2) where the rotation of the reel 40 with respect to the case 12 is stopped by meshing the case side gear 82 with the reel side gear 54, and a rotation allowance (permitting) position (refer to FIG. 3) where the brake member moves upward (one side of the reel axis direction) from the rotation lock position, releases the meshing state between the case side gear 82 and the reel side gear 54, and allows the reel 40 to rotate with respect to the case 12. That is, in the reel locking mechanism 110, by the relative displacement of the brake member 80 and the reel 40 along the reel axis direction, the rotation lock of the reel 40 with respect to the case 12 and the lock release are switched.

Further, between the ceiling plate 14A (a ring-shaped stopper 76 which will be described later) of the case 12 and a spring receiving surface 80A that is an external top surface of each guide piece 84 in the brake member 80, a compression coil spring 78 that servers as a first biasing section is disposed in a compression state. The brake member 80 is always biased to the side of the rotation lock position, by an urging force of the compression coil spring 78. The reel 40 is biased to the lowest position, by the urging force of the compression coil spring 78 that is transmitted to the floor plate portion 42B through the brake member 80. Accordingly, in this embodiment, the rotation lock position of the brake member 80 becomes an axis direction position where the case side gear 82 is meshed with the reel side gear 54 of the reel 40 biased to the lowest position.

An operation projection 88 projects from the axially central portion of the bottom surface of the braking member 80. In the state in which the braking member 80 is positioned at the rotation locking position, the operation projection 88 is disposed in the through hole 55 of the reel 40. Due to the operation projection 88 being pushed by the releasing projection 104 of the rotating shaft 100, the braking member 80 moves from the rotation locking position to the rotation permitting position.

More specifically, as the rotating shaft 100 approaches the reel 40 along the axial direction in order to make the driving gear 102 mesh with the reel gear 50, the releasing projection 104, which projects further upwardly than the driving gear 102 from the axially central portion of the rotating shaft 100, pushes the operation projection 88, and moves the braking member 80 to the rotation permitting position against the urging force of the compression coil spring 78. Further, the rotating shaft 100 moves the reel 40 to the raised position, in the state in which the positioning surface 108 abuts the lower end surface of the reference convex portion 48 of the reel 40 against the urging force of the compression coil spring 78.

The braking member 80 has engaging projections 86 which project from the top surface of the braking member 80 in order to move locking members 90, which will be described later, from restricting positions to restriction releasing positions, due to the braking member 80 moving from the rotation locking position to the rotation permitting position. The structures of the engaging projections 86 will be described together with the locking members 90.

Figure 5A:
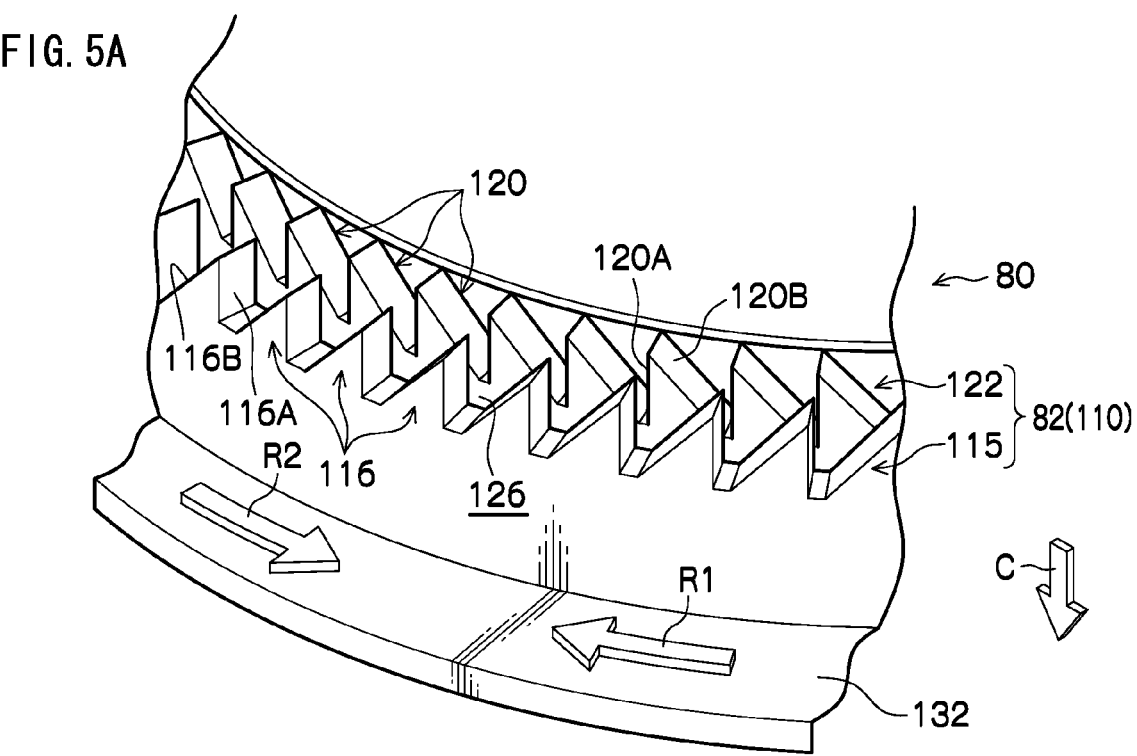
FIG. 5A is an enlarged perspective view illustrating an engagement gear in a reel locking section that constitutes a recording tape cartridge according to a first embodiment of the present invention.
Figure 5B:
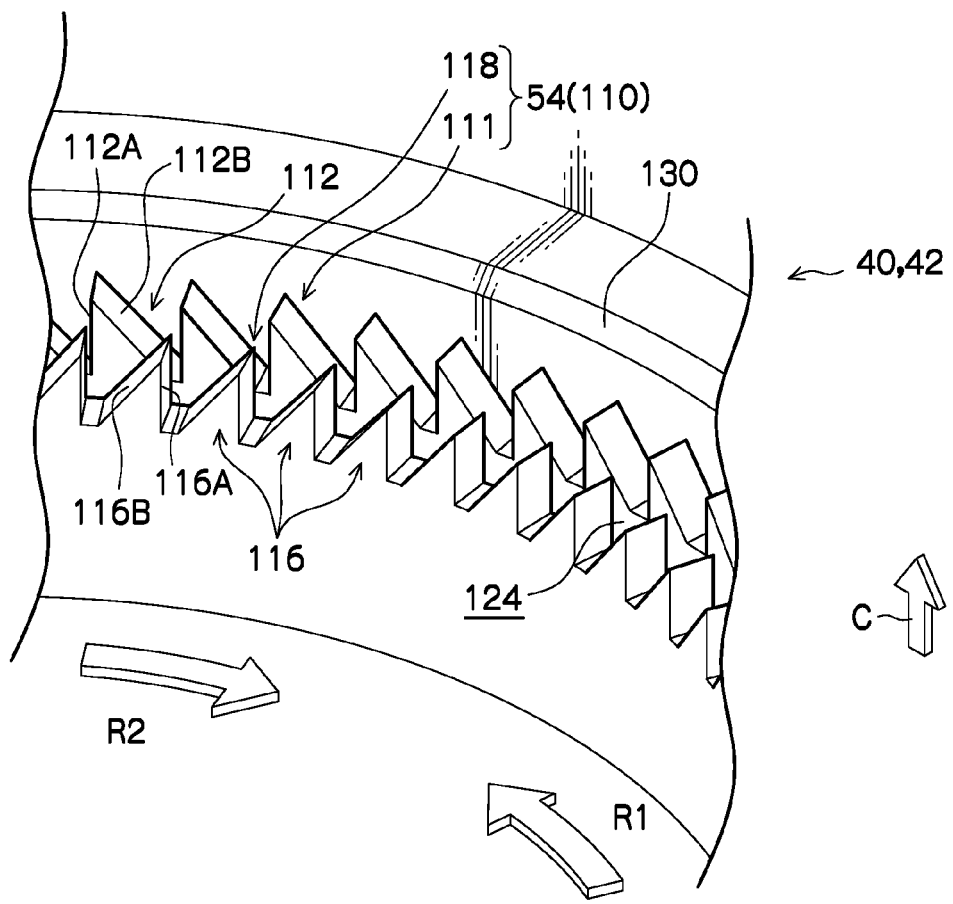
FIG. 5B is an enlarged perspective view illustrating a brake gear in a reel locking section that constitutes a recording tape cartridge according to a first embodiment of the present invention.

Next, the shapes of the reel side gear 54 and the case side gear 82 will be described. As shown in FIG. 4, the reel side gear 54 has a gear train 111 that is disposed along a virtual circumference coaxial with the reel 40, and the gear train 111 has plural piece taper teeth (one-side taper teeth) 112. As shown in FIG. 5, each piece taper tooth 112 has a first mesh surface 112A that is oriented in a rotation direction (refer to an arrow R1 of FIG. 4) of when a magnetic tape T at the reel 40 is wounded, and a second mesh surface 112B that is oriented in a rotation direction (refer to an arrow R2 of FIG. 4) of when the magnetic tape T at the reel 40 is drawn (pulled out). In addition, each piece taper tooth 112 has a piece taper shape (one side taper shape) shape such that each of the first mesh surfaces 112A is approximately parallel to the axis direction of the reel 40, and each of the second mesh surfaces 112B is inclined with respect to the axis direction of the reel 40. In this embodiment, the gear train 111 is formed in an approximately annular shape, due to that the piece taper teeth 112 are continuously (densely) disposed over the entire circumference.

Meanwhile, as shown in FIGS. 4 and 5, the case side gear 82 has a gear train 115 that includes plural piece taper teeth (one-side taper teeth) 114, which can be meshed with the plural piece taper teeth 112, disposed along the virtual circumference coaxial with the brake member 80. That is, each piece taper tooth 114 that constitutes the gear train 115 has a piece taper shape (one side taper shape) such that each of the first mesh surfaces 114A that is oriented in a direction shown by the arrow R2 is approximately parallel to the axis direction of the reel 40 (the brake member 80), and each of the second mesh surfaces 114B that is oriented in a direction shown by an arrow R1 is inclined with respect to the axis direction of the reel 40. In this embodiment, the gear train 115 is formed in an approximately annular shape, due to that the piece taper teeth 114 are continuously (densely) disposed over the entire circumference.

As described above, as the brake member 80 approaches the cylindrical portion 42A of the reel hub 42 along the axis direction, the reel side gear 54 and the case side gear 82 are invited to the circumferential direction (guided to the circumferential direction) by the second mesh surfaces 112B and 114B, and meshed with each other. In addition, in the mesh state, if the reel 40 rotates in a direction shown by the arrow R1 with respect to the case 12, the first mesh surface 112A and the first mesh surface 114A are meshed with each other (engaged with each other).

Further, as shown in FIGS. 4 and 5, in this embodiment, the reel side gear 54 has a gear train 118 that includes plural inverse (opposite) piece taper teeth (inverse one-side taper teeth) 116 that are piece taper teeth which are oriented in the direction opposite to the orientation of the plural piece taper teeth 112. The case side gear 82 has a gear train 122 that includes plural inverse (opposite) piece taper teeth (inverse one-side taper teeth) 120 that can be meshed with the inverse taper teeth 116. That is, each inverse piece taper tooth 116 that constitutes the gear train 118 has a piece taper shape (one side taper shape) such that a first mesh surface 116A that is oriented in the direction shown by the arrow R2 is approximately parallel to the axis direction of the reel 40 (the brake member 80), and a second mesh surface 116B that is oriented in the direction shown by the arrow R1 is inclined with respect to the axis direction of the reel 40. Further, each inverse piece taper tooth 120 that constitutes the gear train 122 has a piece taper shape (one side taper shape) such that a first mesh surface 120A that is oriented in the direction shown by the arrow R1 is approximately parallel to the axis direction of the reel 40 (the brake member 80), and a second mesh surface 120B that is oriented in the direction shown by the arrow R2 is inclined with respect to the axis direction of the reel 40.

In this embodiment, the gear train 118 is formed in an approximately annular shape, due to that the inverse piece taper teeth 116 are continuously disposed over the entire circumference. In addition, the gear train 122 is formed in an approximately annular shape, due to that the inverse piece taper teeth 120 are continuously disposed over the entire circumference.

As described above, as the brake member 80 approaches the cylindrical portion 42A of the reel hub 42 along the axis direction, the reel side gear 54 and the case side gear 82 are invited to the circumferential direction (guided to the circumferential direction) by a combination of the second mesh surfaces 112B and 114B and a combination of the second mesh surfaces 116B and 120B, and meshed with each other. In addition, in the mesh state, if the reel 40 rotates in a direction shown by the arrow R1 with respect to the case 12, the first mesh surfaces 112A and 114A are meshed with each other (engaged with each other), and the second mesh surfaces 116B and 120B are meshed with each other. If the reel 40 rotates in a direction shown by the arrow R2 with respect to the case 12, the first mesh surfaces 116A and 120A are meshed with each other and the second mesh surfaces 112B and 114B are meshed with each other.

Further, in this embodiment, in the reel side gear 54, the gear train 111 is disposed coaxially from the outer circumference side with respect to the gear train 118. Specifically, the gear train 111 is integrally formed at the side of the inner surface of the upper portion of the inner cylindrical tube portion 42C of the reel hub 42, and the gear train 118 is integrally formed at the corner portion of the inner cylindrical tube portion 42C and the floor plate portion 42B. That is, the reel side gear 54 (the gear trains 111 and 118) in this embodiment is integrally formed with the reel hub 42, by injection forming (molding) of the resin. As shown in FIG. 4, a gap 124 having a groove shape that is opened upward is formed between the gear train 111 and the gear train 118.

In the same way, in the case side gear 82, the gear train 115 is disposed coaxially from the outer circumference side with respect to the gear train 122. The gear train 115 is formed in the outermost circumferential portion of the lower portion in the brake member 80. The gear train 122 is disposed in the inner side of gear train 115, and a gap 126 having a groove shape that is opened downward is formed between the gear train 122 and the gear train 115. In addition, the reel side gear 82 (the gear trains 115 and 122) in this embodiment is integrally formed with the brake member 80, by injection forming (molding) of the resin.

Further, the reel locking mechanism 110 includes a guide structure 128 that centers the brake member 80 (the case side gear 82) with respect to the reel hub 42 (reel side gear 54)

when the brake member 80 approaches to the floor plate portion 42B of the reel hub 42. As shown in FIG. 4, the guide structure 128 includes a bowl-shape taper portion 130, that has a larger diameter as being nearer the upper side, formed on the inner edge portion of the upper end of the inner cylindrical tube portion 42C, and a taper portion 132, that has a smaller diameter as being nearer the lower side, formed on the outer circumferential portion of the brake member 80.

By the guide structure 128, even though the brake member 80 approaches the floor plate portion 42B in a deviated state with respect to (the axis of) the reel 40, the brake member 80 is centered with respect to the reel 40 by the taper portion 130 and the taper portion 132 (including a case where the reel 40 is centered with respect to the brake member 80, that is, the case 12).

Configuration of a Reel Play Restriction Mechanism

Further, when the reel 40 is not used, the locking portion 93 of the locking member 90 is inserted into the gap G between the ceiling plate 14A in a state deviated at the lowest position. As a result, displacement of the axis direction with respect to the case 12 is regulated (restricted), which will be specifically described hereinafter.

As shown in FIGS. 2 through 6, the recording tape cartridge 10 has the locking members 90 which are for preventing vertical movement of the reel 40 with respect to the case 12, i.e., for preventing the annular rib 46C from approaching and moving away from the abutment surface 16C. A plurality of (three in the present embodiment) the locking members 90 are provided. When the locking members 90 are described hereinafter, the respective directions at the time when the locking members 90 are in their assembled states will be used. Further, in the following explanation, when the term "radial direction" is used, there are cases in which it refers to the radial direction of the reel 40 accommodated in the case or to a direction parallel to that direction.

As shown in FIGS. 2 through 6, each locking member 90 includes a body portion 92 that slidably comes into contact with the ceiling plate 14A and that is formed in a longitudinal approximate prismatic shape in the radial direction. In the outer end of each body portion 92 in the radial direction, the locking portion 93 is provided. As shown in FIG. 8, the locking portion 93 has a top surface that is flush with the top surface of the body portion 92, and the thickness D of the locking portion 93 in the upward-to-downward direction is slightly smaller than a distance W of the gap G between the upper end face of the cylindrical portion 42A of the reel 40 disposed at the lowest position and the inner surface of the ceiling plate 14A (D<W).

The locking member 90 each can obtain a regulation (restricting) position (refer to FIG. 2) where the locking member 90 moves in the radial direction while sliding with the ceiling plate 14A, inserts the locking portion 93 into the gap G, so regulates rising of the reel 40 from the lowest position, and a regulation (restricting) release position (refer to FIG. 3) where the locking member evacuates the locking portion 93 from the gap G and allows the reel 40 to move from the lowest position to the raised position. Further, in the recording tape cartridge 10, as described above, the thickness D of the locking portion 93 is set to be slightly smaller than the distance W of the gap G (D<W). As shown in FIG. 8, between the bottom surface of the locking portion 93 disposed at the regulation position and the top surface of the upper flange 44 and between the top surface of the locking portion 93 disposed at the regulation position and the bottom surface of the ceiling plate 14A, small clearances C1 and C2 are formed. As a result, the locking portion 93 can be smoothly evacuated with respect to the gap G.

An engaging portion 96, which projects downward from the radial direction inner end portion of the lock portion 93 at the main body portion 92, is provided at each of the locking members 90. The radial direction outer surface of the engaging portion 96 is formed in an arc-shape which corresponds to the inner peripheral surface of the cylindrical tube portion 42A. When the locking members 90 are positioned at their restricting positions, these radial direction outer surfaces of the engaging portions 96 planarly-contact the inner peripheral surface of the cylindrical tube portion 42A. In this way, movement of the locking members 90 toward the radial direction outer side past their restricting positions is prevented. Note that the drafts, along the reel axial direction, of the engaging portion 96 and (at least the vicinity of the top end of) the cylindrical tube portion 42A are substantially 0 degree, such that no gap is formed therebetween. Further, a taper surface 96A, which is arc-shaped in bottom view and which is directed downwardly and outwardly in the radial direction, is formed at the lower end portion of each engaging portion 96, and is used for the assembling-in of the locking member 90 as will be described later.

Figure 6:
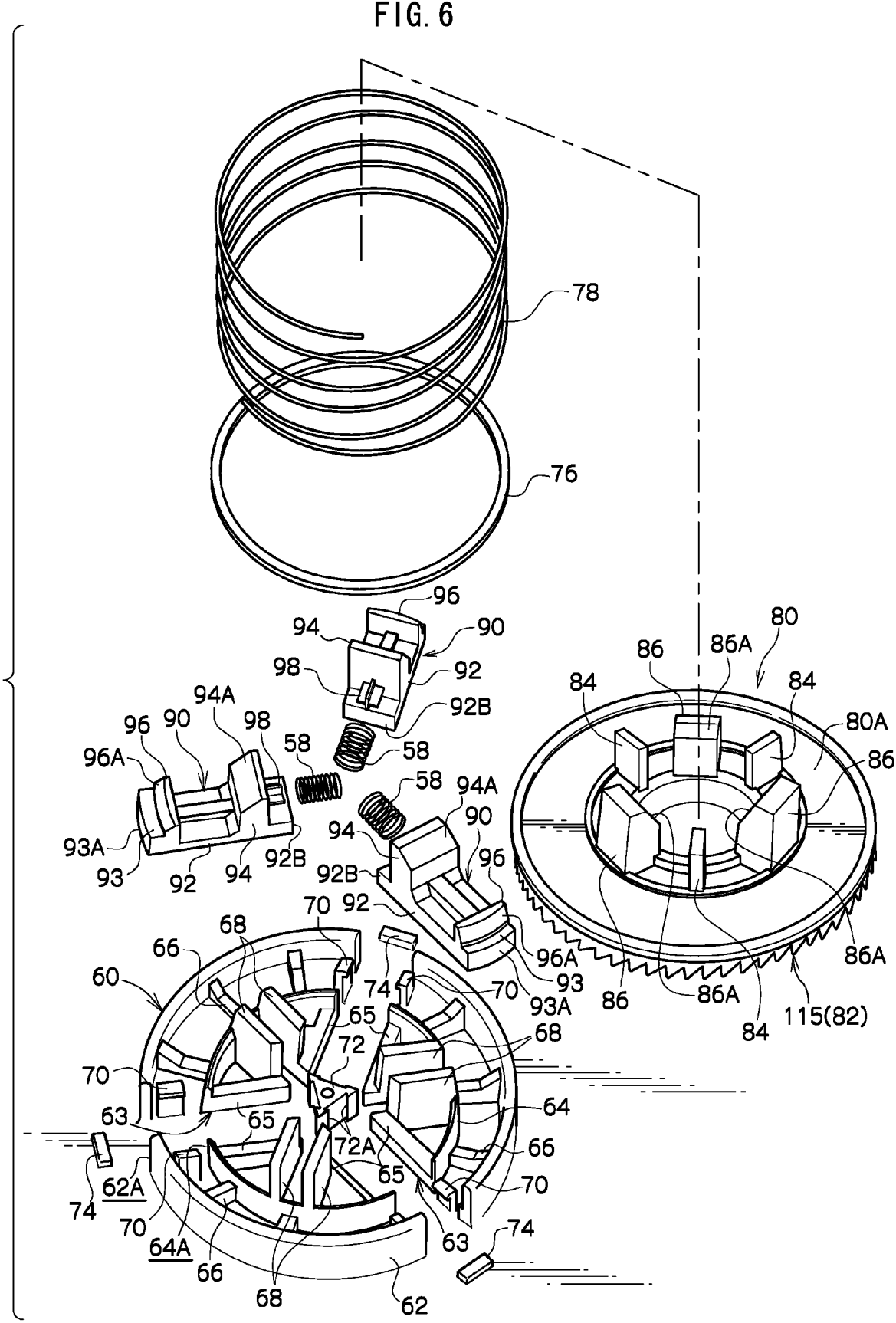
FIG. 6 is an exploded perspective view illustrating a reel locking section that constitutes a recording tape cartridge according to a first embodiment of the present invention.

Further, each locking member 90 includes a cam portion 94 that serves as a pressed portion protruding downward from an inner end of the body portion 92 in the radial direction. The cam portion 94 cooperates with the engaging protrusion 86 that serves as a pressing portion constituting the brake member 80, and converts a portion of the movement force of the brake member 80 from the rotation lock position to the rotation allowance position into the movement force of the locking member 90 from the regulation position to the regulation release position. This configuration will be described in detail below. Further, each locking member 90 includes a fitting portion 98 that protrudes to the inner side of the radial direction from each cam portion 94. Each fitting portion 98 forms an approximately cross line in an axis direction, as shown in FIG. 6. One end of a compression coil spring 56 that will be described in detail below is fitted to the fitting portion 98 and is held.

Figure 7:
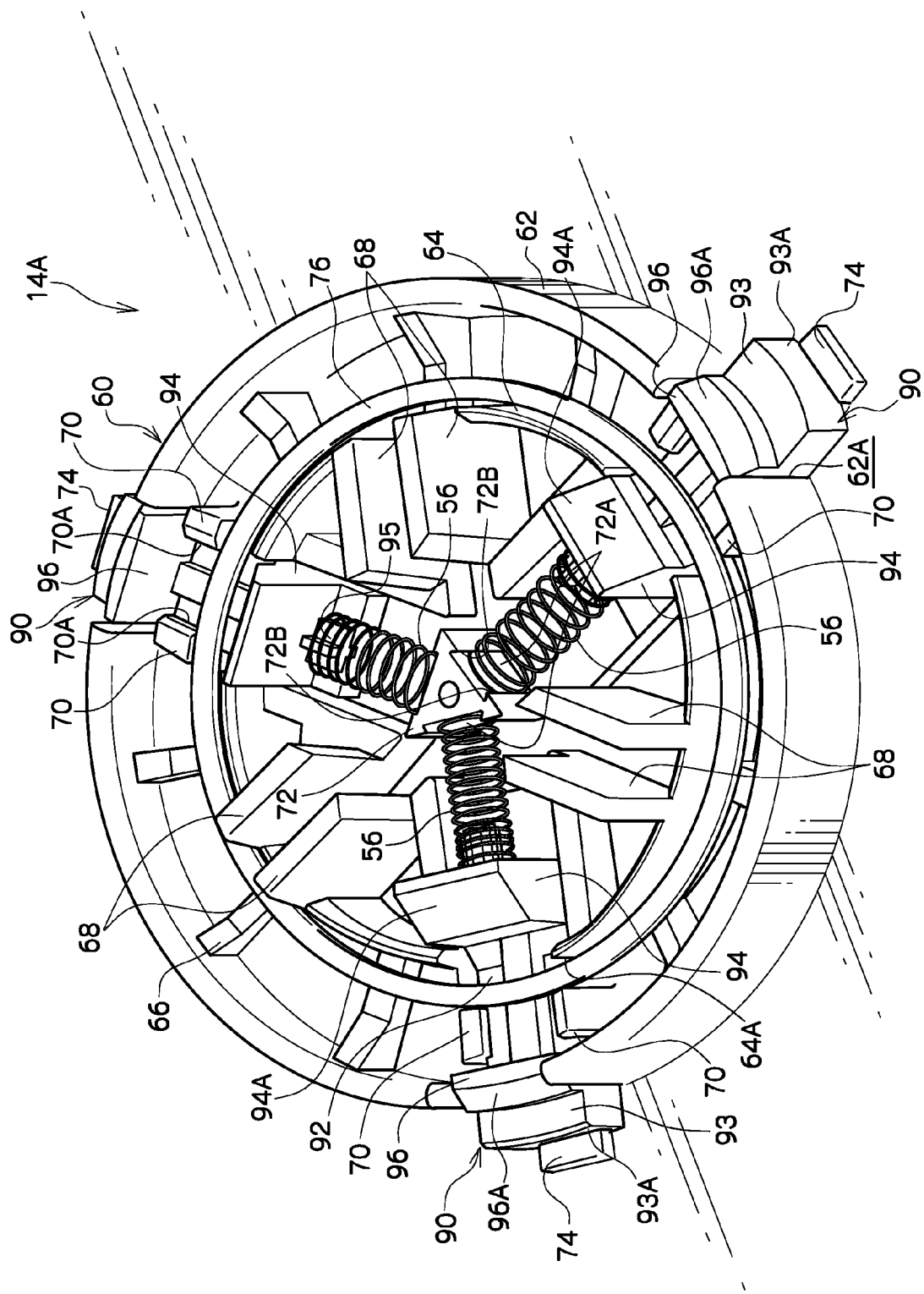
FIG. 7 is a perspective view illustrating a temporary assembly state of a reel locking section that constitutes a recording tape cartridge according to a first embodiment of the present invention.

The above-described locking members 90 are held, so as to be movable in the radial direction, by a holding portion 60 provided at the ceiling plate 14A of the case 12. As shown in FIGS. 6 and 7, the holding portion 60 has annular walls 62, 64 which stand erect at the inner surface of the ceiling plate 14A, and which are substantially coaxial with the reel 40 in the assembled state. The annular wall 62, which is positioned at the outer side, has a standing height from the ceiling plate 14A which is greater than that of the annular wall 64 at the inner side (i.e., the bottom end of the annular wall 62 is positioned further downward than the bottom end of the annular wall 64). The outer diameter of the annular wall 62 is smaller than the inner diameter of the cylindrical tube portion 42A of the reel 40, and the holding portion 60 does not interfere with the reel 40 which is positioned at the raised position.

Three places of the annular walls 62, 64, which correspond to one another and are at uniform intervals in the peripheral direction, are cut-out along the entire heights thereof, such that cut-out portions 62A, 64A are formed. The opening widths of the cut-out portions 62A, 64A correspond to the widths of the locking members 90. The annular walls 62, 64 are connected by plural supporting ribs 66 which project from the ceiling plate 14A. In the present embodiment, three of the supporting ribs 66 are provided between each of the cut-out portions 62A, 64A, such that a total of nine of the supporting ribs 66 are provided.

The holding portion 60 has three pairs of guide walls 65 which stand erect from the ceiling plate 14A and are positioned at the inner side of the annular wall 64. Each pair of guide walls 65 is disposed such that, in bottom view, the opposing surfaces thereof coincide with imaginary lines connecting the edge portions of the cut-out portions 62A, 64A. Each pair of guide walls 65, together with the cut-out portions 62A, 64A, forms an accommodating portion 63 which accommodates the locking member 90 such that the locking member 90 is movable in the radial direction. Namely, in the state in which the locking members 90 are accommodated in the respectively different accommodating portions 63, the locking members 90 move in the radial direction while being guided by the guide walls 65 and the edge portions of the cut-out portions 62A, 64A.

Holding projections 70 project between the annular walls 62, 64 and between the edge portions of the cut-out portions 62A, 64A. Each holding projection 70 is positioned on an imaginary line extending from the corresponding guide wall 65. An engaging convex portion 70A, which juts out at the lower side of the accommodating portion 63, is provided at the bottom end of each holding projection 70. The bottom end of each engaging convex portion 70A at the side facing its partner engaging convex portion 70A is a taper surface. When the locking member 90 is assembled in from below, the taper surfaces engage with the corner portions of the main body portion 92. In this way, when the locking member 90 is assembled in, the pair of holding projections 70 deform and permit installation of the locking member 90 into the accommodating portion 63, and the engaging convex portions 70A impede the falling-out of the locking member 90 in this installation. Namely, even if the ceiling plate 14A is made to face downward (in the vertical direction), the locking members 90 are in provisionally held states in which they do not fall out from the holding portion 60.

Further, in a shaft center portion of the holding portion 60, a spring receiving convex portion 72 protrudes. The spring receiving convex portion 72 forms an approximately triangular prism shape that has three spring receiving surfaces 72A corresponding to the three locking members 90. In both sides of each spring receiving surface 72A in a widthwise direction, a locking claw 72B is formed. The spring receiving convex portion 72 is used for supporting the compression coil spring 56 that will be described in detail below.

Further, stopper ribs 74 project from the ceiling plate 14A at the outer side of the annular wall 62, along a circumference which is coaxial with the annular wall 62. The stopper ribs 74 are disposed at the radial direction outer sides of the accommodating portions 63, respectively, and are for provisionally stopping the locking members 90. The stopper ribs 74 are disposed slightly further toward the radial direction outer side than the radial direction outer ends of the lock portions 93 of the locking members 90 which are positioned at the restricting positions. The distance between the stopper rib 74 and the radial direction outer end of the lock portion 93 in this state is slightly smaller than the length of the taper surface 96A as projected on a horizontal plane (a plane orthogonal to the axis of the reel). Further, the heights by which the stopper ribs 74 project out from the ceiling plate 14A are kept low such that the stopper ribs 74 do not interfere with the reel 40 which is positioned at the raised position.

One set of two of the guide wall portions 68 stands erect from the region between each pair of the guide walls 65, at the inner side of the annular wall 64 of the ceiling plate 14A. Namely, there are three sets of, or a total of six of, the guide wall portions 68. The guide plates 84 of the braking member 80 enter between the guide wall portions 68 of the respective sets. The opposing interval between the guide wall portions 68 of each one set is equivalent to or slightly larger than the thickness of the guide piece 84, so as to impede rotation of the braking member 80 and suppress joggling. The guide wall portions 68 are of heights such that they can always maintain the state in which the guide pieces of the braking member 80, which moves between the rotation locking position and the rotation permitting position, are inserted therein. The radial direction inner ends of the guide wall portions 68 are continuous with the guide walls 65. The radial direction outer ends of the guide wall portions 68 are continuous with the annular wall 64.

The above-described holding portion 60 may be structured by a plate-shaped member which is separate from the ceiling plate 14A and is mounted to the ceiling plate 14A. If the holding portion 60 is structured in this way, there are advantages such as the locking members 90 and the holding portion 60 can be formed as a module, which allows for a mold to be used in common also for, for example, the case 12 (the upper case 14) and the recording tape cartridge which do not have the locking members 90. Further, in the above-described structure, because the engaging convex portions 70A of the holding projections 70 form undercut structures, it is difficult to make the engaging convex portions 70A large. However, the formation of an undercut structure can be avoided by providing a through hole between the holding projections 70 at the above-described plate-shaped member. In this structure, the engaging convex portions 70A are made to be large, and there is no need for a ring-shaped stopper 76 which will be described later. Further, the ring-shaped stopper 76 is not needed even if only the holding projections 70 are attached later as members which are separate from the upper case 14.

The respective locking members 90 are accommodated in the different accommodating portions 63 of the above-described holding member 60. In this way, the locking members 90 are disposed at uniform intervals in the peripheral direction of the reel 40, and are guided so as to be able to move only in the radial direction while sliding on the ceiling plate 14A. In this state, the locking members 90 are actually pressed by the ring-shaped stopper 76 which is fixed to the respective supporting ribs 66, such that the locking members 90 are reliably impeded from falling-out from the holding portion 60. The ring-shaped stopper 76 is fixed to the bottom surfaces of the respective supporting ribs 66 by ultrasonic welding for example. In the present embodiment, the ring-shaped stopper 76 is also used as a spring receiving portion which receives the top end of the compression coil spring 78. Note that the top end of the compression coil spring 78 may be received by the respective supporting ribs 66.

Further, in the shaft center portion of the holding portion 60, a compression coil spring 56 that serves as a second biasing section to bias each locking member 90 to the side of the regulation position is disposed. The compression coil spring 56 is provided for each locking member 90. In each compression coil spring 56, an end is fitted to the fitting portion 98 of the corresponding locking member 90 and is held, and the other end abuts the spring receiving surface 72A of the spring receiving convex portion 72. In the other end of each compression coil spring 56, a positional deviation with respect to the spring receiving surface 72A is prevented by the locking claw 72B of the spring receiving convex portion 72.

Each compression coil spring 56 is configured to become a compression state, in a state where the locking portion 93 of the corresponding locking member 90 abuts the stopper rib 74 and the engagement portion 96 abuts the inner surface of the cylindrical portion 42A of the reel 40. That is, each compression coil spring 56 biases the locking member 90 to the outside of the radial direction, and presses the engagement portion 96 to the cylindrical portion 42A of the reel 40 or the locking portion 93 to the stopper rib 74.

In addition, in the recording tape cartridge 10, before bonding the upper case 14 and the lower case 16, as shown in FIG. 7, by section of the urging force of the compression coil spring 56, the locking portion 93 of the locking member 90 is pressed to the stopper rib 74. In this state, if the upper case 14 is assembled in the lower case 16 that deviates the reel 40 where the case side gear 82 of the brake member 80 on which the compression coil spring 78 is loaded to the lowest position, the inner edge portion of the upper end of the cylindrical portion 42A is engaged with the taper surface 96A of each locking member 90 and converts a portion of the assembling force of the reel axis direction into the movement force of each locking member 90 to the inner side of the radial direction, and each locking member 90 moves from the temporary holding position to the regulation position, against the urging force of the compression coil spring 56. Further, by the above operation, the brake member 80 is positioned before assembling, such that each guide piece 84 of the brake member 80 is inserted between the corresponding guide walls 68. Further, by the above operation, a door 30 is pivotally supported to a spindle 26. In addition, in this state, if the upper case 14 and the lower case 16 are fixedly bonded to each other, the recording tape cartridge 10 is assembled.

In the shipment state which is this assembled state, i.e., the state of non-use, as shown in FIG. 2, the reel 40 is positioned at the lowermost position due to the urging force of the compression coil spring 78, the braking member 80 is positioned at the rotation locking position due to the urging force of the compression coil spring 78, and the locking members 90 are positioned at the restricting positions due to the urging force of the compression coil spring 56. Accordingly, rotation of the reel 40, which is positioned at the lowermost position, with respect to the case 12 is impeded by the braking member 80, and axial direction movement of the reel 40 with respect to the case 12, i.e., movement of the reel 40 toward the raised position, is restricted by the locking members 90. This state of the recording tape cartridge 10 is called the state of non-use.

At the recording tape cartridge 10, as described above, due to the braking member 80 moving from the rotation locking position to the rotation permitting position due to the rotating shaft 100, the locking members 90 move from the restricting positions to the restriction releasing positions. Specifically, as shown in FIG. 7, taper surfaces 86A, which face upwardly and toward the radial direction inner side, are formed at the top ends of the engaging projections 86 which project out from the top surface of the braking member 80. Further, taper surfaces 94A, which face downwardly and toward the radial direction outer side, are formed at the bottom ends of the cam portions 94 which project downwardly from the radial direction inner ends of the locking members 90. The taper surfaces 86A and the taper surfaces 94A are mutually corresponding angles of inclination which can planarly contact one another. The angles of inclination are set within a range of 30° to 60°, and are 45° in the present embodiment.

In this way, when the braking member 80 moves upward with respect to the case 12, while the taper surfaces 86A and the taper surfaces 94A contact one another, the upward (toward the upper side in the axial direction of the reel) moving force of the braking member 80 is converted into moving force which moves the locking members 90 toward the inner side in the radial direction. In this way, as shown in FIG. 3, the locking members 90 move to the restriction releasing positions, the braking member 80 moves to the rotation permitting position, and the reel 40 reaches the state of having moved to its raised position. The state of the recording tape cartridge 10 at this time is called the state of usage.

In this state of usage, the cam portions 94 of the locking members 90 are made to enter in at the inner sides of the corresponding engaging projections 86 of the braking member 80, and the surfaces of the cam portions 94, which surfaces face outwardly in the radial direction, are made to abut the surfaces of the corresponding engaging projections 86, which surfaces face inwardly in the radial direction. The drafts of the radial direction outwardly-facing surfaces of the cam portions 94 of the locking members 90 and the radial direction inwardly-facing surfaces of the engaging projections 86 of the braking member 80, are substantially 0°. In the state of usage, components of force in the axial direction of the reel 40 due to the urging forces of the compression coil spring 78 and the compression coil spring 56 do not arise.

As shown in FIG. 2, in the state of non-use, a predetermined clearance is set between the taper surface 94A of each cam portion 94 and the taper surface 86A of each engaging projection 86. In this way, in the state of non-use, the components of force of the urging force of the compression coil spring 56 are prevented from being applied to the braking member 80. Further, this clearance (distance of separation along the axial direction of the reel) is smaller than the amount of meshing, along the reel axial direction, between the case side gear 82 and the reel side gear 54. Namely, before the meshing-together of the case side gear 82 and the reel side gear 54 is released, the taper surfaces 86A, 94A interfere with one another.

Next, the state in which axial direction movement of the reel 40 is restricted by the locking members 90 will be described in detail. As shown in FIG. 8, a length L, along the radial direction, of the lock portion 93 is less than or equal to the thickness tr, along the radial direction, of the cylindrical tube portion 42A of the reel 40. Accordingly, radial direction outer ends 93A of the lock portions 93 of the locking members 90 positioned at their restricting positions, are positioned within the range of the thickness tr of the cylindrical tube portion 42A. In the state in which the locking members 90 are positioned at the restricting positions, the radial direction outer ends 93A of the lock portions 93 are positioned further toward the radial direction outer side than the inner surface (inner diameter di) of the annular rib 46C of the reel 40. Note that the length L is set such that, in a case in which the inner diameter of the gear opening 18 of the case 12, i.e., the diameter of the inner edge of the abutment surface 16C, is greater than the inner diameter di of the annular rib 46C, the radial direction outer ends 93A of the lock portions 93 of the locking members 90, which are positioned at the restricting positions, are positioned further toward the radial direction outer side than the inner edge of the abutment surface 16C.

Accordingly, the abutment surface 16C of the case 12 and the lock portions 93 of the locking members 90 positioned at the restricting positions are positioned so as to overlap one another in the radial direction of the reel 40 (so as to overlap when projected in the reel axial direction), within the range of the thickness tr of the cylindrical tube portion 42A. Because the abutment surface 16C is annular (has an endless shape), the abutment surface 16C and the lock portions 93 overlap one another also in the peripheral direction of the cylindrical tube portion 42A, within the range of the thickness Tr. In other words, the region of the reel 40 that attempts to move toward the ceiling plate 14A and abuts the lock portion 93, and the region of the reel 40 that attempts to move toward the floor plate 16A and abuts the abutment surface 16C, overlap one another in the peripheral direction and the radial direction of the cylindrical tube portion between the inner and outer peripheral surfaces of the cylindrical tube portion 42A (within the range of the thickness Tr), as seen from the axial direction of the reel 40.

As described above, in the state of non-use of the recording tape cartridge 10, among the respective surfaces of the reel 40 which face upward or downward, only the top end surface of the cylindrical tube portion 42A and the bottom end surface of the annular rib 46C, which are positioned within the range of the thickness tr of the cylindrical tube portion 42A (between the inner and outer peripheral surfaces), are made to abut or are made to extremely closely approach the lock portions 93 of the locking members 90 and the abutment surface 16C of the case 12, respectively. Namely, when the reel 40 attempts to move upward or downward, the vertical direction movement restricting force which restricts this upward or downward movement is applied only to portions of the reel 40, which portions are within the range of the thickness tr of the cylindrical tube portion 42A. Moreover, as described above, the lock portions 93 of the locking members 90 positioned at the restricting positions overlap the abutment surface 16C of the case 12 within the range of the thickness tr. Therefore, the aforementioned moving restricting force does not generate a couple of forces which tilts the reel 40 with respect to the case 12 (there is no need to cancel a couple of forces by providing plural lock portions 93).

Figure 10:
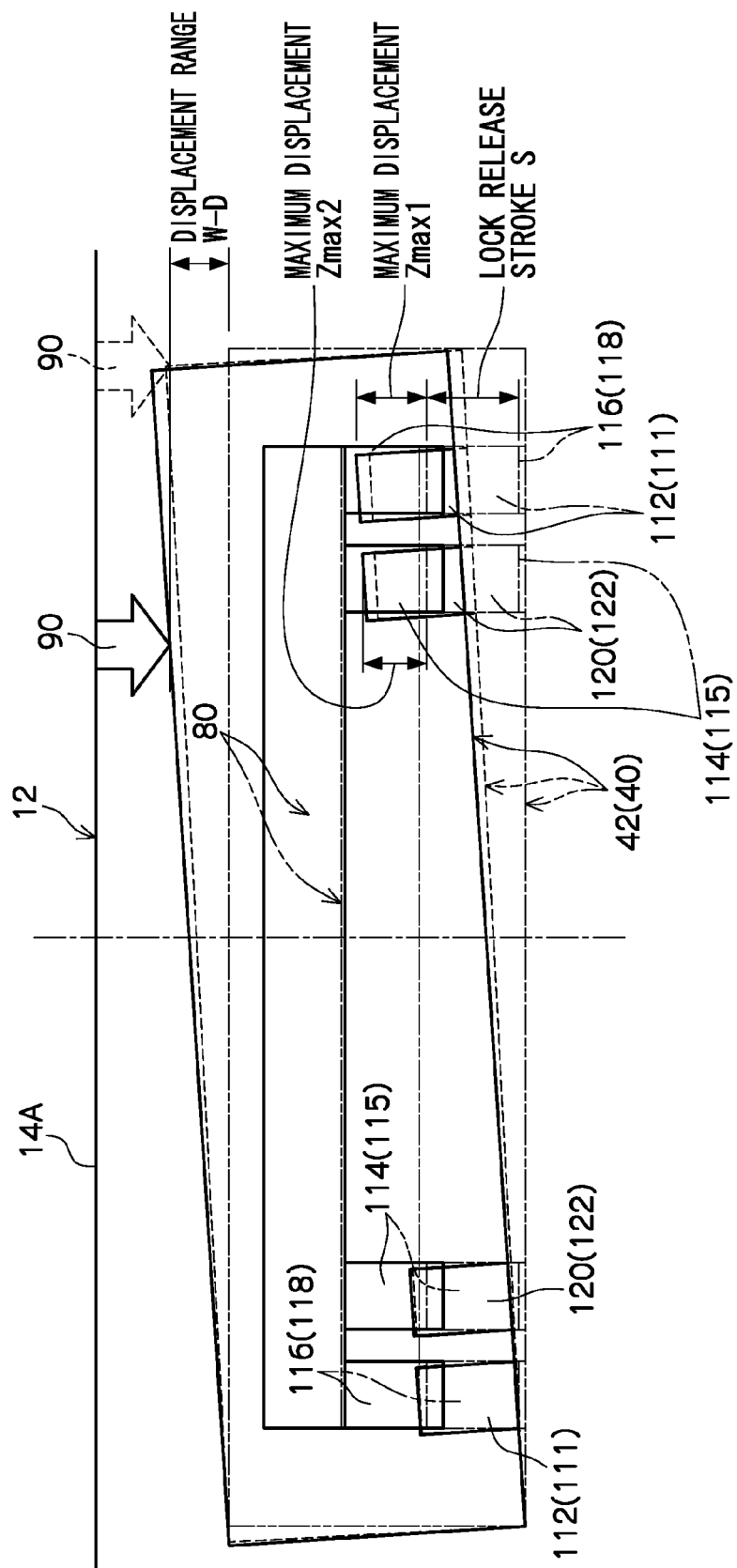
FIG. 10 is a schematic diagram illustrating an inclination state of a reel in a case of a recording tape cartridge according to a first embodiment of the present invention.

In the above-described recording tape cartridge 10, in order to ensure slidability with respect to the case 12 (the holding portion 60) of the locking member 90, the thickness D of the locking portion 93 is set to be slightly smaller than the vertical distance W of the gap G between the ceiling plate 14A and the reel 40 abutting the annular rib 46C to the abutment surface 16C of the case 12, as described above. For this reason, in the recording tape cartridge 10, in a non-utilization state, in a difference (W–D) between the thickness D of the locking portion 93 of each locking member 90 and the vertical distance W of the gap G, the reel 40 can displace with respect to the case 12. A sum of the upper and lower small clearances C1 and C2 of the locking portion 93 that is disposed at the regulation position becomes the displacement allowable range (W–D) of the reel 40, and the reel 40 is inclined with respect to the case 12, as schematically shown in FIG. 10. As shown in FIG. 10, when the reel 40 is inclined with respect to the case 12 with the abutment portion of the abutment 16C of the case 12 and the annular rib 46C being as the center of the rotation, in a case where the locking member 90 is disposed at the position of 180° from the center of the rotation in plan view, as shown by a broken line in FIG. 10, the maximum displacement in the cylindrical portion 42A of the reel 40 is almost equal to the displacement range (W–D). Meanwhile, when the position of 180° from the center of the rotation is the middle portion of the locking members 90 which are adjacent in the circumferential direction, as shown by a solid line in FIG. 10, the displacement of the reel axis direction in the cylindrical portion 42A of the reel 40 becomes larger than the displacement range (W–D). Further, imaginary lines in FIG. 10 show the reel 40 that is disposed at the lowest position and the brake member 80 that is disposed at the rotation lock position.

As such, the displacement amount at the formation portion (position in the radial direction) of the gear train 111 which constitutes the reel side gear 54 in a state where the cylindrical portion 42A of the reel 40 has the largest displacement with respect to the vertical displacement range (W–D) is assumed as the maximum displacement Zmax1. In addition, in the recording tape cartridge 10, as shown in FIG. 10, the displacement (W–D) and the maximum stroke S are set, such that the mesh release stroke S along the reel axis direction to release the mesh of the case side gear 82 of the brake member 80 and the reel side gear 54 of the reel 40 becomes larger than the maximum displacement Zmax1.

Further, the mesh release stroke S is a stroke along the reel axis direction until the piece taper tooth 112 gets away from between the piece taper teeth 114 from the rotation lock position. That is, the mesh release stroke S can be grasped as the overlapping amount along the reel axis direction of the case side gear 82 and the reel side gear 54. Also, the mesh release stroke S can be grasped as a portion of the displacement range of the brake member 80 until the rotation allowance position from the rotation lock position. Further, in this embodiment, the mesh release stroke of the gear train 118 and the gear train 122 is set to be almost equal to the mesh release stroke S of the gear train 111 and the gear train 115 as described above. For this reason, the mesh release stroke of the gear train 118 and the gear train 122 becomes larger than the maximum displacement Zmax2 (Zmax2 is smaller that Zmax1) at the formation portion of the gear train 118 in the case where the reel 40 is inclined with respect to the case 12, as shown in FIG. 10.

As such, in the recording tape cartridge 10 according to this embodiment, it can be understood that the compression coil spring 78 and the locking member 90 correspond to the mesh holding section in this invention. Further, it also can be understood that any one of the compression coil spring 78 and the locking member 90 independently corresponds to the mesh holding section in this invention.

Next, operation of the first embodiment will be described.

When the recording tape cartridge 10 having the above-described structure is in the state of non-use such as is being stored or transported or the like (i.e., when the recording tape cartridge 10 is not loaded in a drive device), the door 30 closes the opening 20 due to the urging force of the torsion spring 28. Further, the leader tape 22 is disposed along the left side wall 12B due to the jutting portions 22B being accommodated (inserted) and held within the slot portions 24.

Due to the urging force of the compression coil spring 78, the reel 40 is positioned at the lowermost position at which the bottom end surface of the annular rib 46C abuts the abutment surface 16C of the case 12, and the braking member 80 is positioned at the rotation locking position at which the case side gear 82 is made to mesh with the reel side gear 54 of the reel 40. Further, due to the urging force of the compression coil spring 56, the respective locking members 90 are positioned at the restricting positions at which the lock portions 93 thereof are disposed in the gap G between the ceiling plate 14A and the top end surface of the cylindrical tube portion 42A. Namely, as shown in FIG. 2, the recording tape cartridge 10 is in the state of non-use.

For these reasons, rotation of the reel 40 with respect to the case 12 is impeded, and upward and downward movement of the reel 40 with respect to the case 12 is restricted to less than or equal to an allowable amount (an amount which is sufficiently smaller than the amount of movement from the lowermost position to the raised position, an amount which is sufficiently smaller than the vertical distance W of the aforementioned gap G). Accordingly, even if the user carelessly pushes the floor portion of the reel 40 (including the reel plate 52) or drops the recording tape cartridge 10, joggling and tilting (i.e., a change in the posture) of the reel 40 within the case is prevented or suppressed.

When the magnetic tape T is to be used, the recording tape cartridge 10 is loaded, from the front wall 12A side thereof, into a bucket (not illustrated) of a drive device. Accompanying this loading operation, an opening/closing member (not illustrated) of the drive device pushes the portion of the door 30 which portion is further toward the right than the supporting shaft 26. Thus, the door 30 rotates around the supporting shaft 26 against the urging force of the torsion spring 28, and the opening 20 is opened.

Next, with the opened state of the opening 20 being maintained, the bucket is lowered, and the rotating shaft 100 of the drive device relatively approaches the case 12 from beneath (moves upward with respect to the case 12). Thus, while the releasing projection 104 of the rotating shaft 100 pushes the operation projection 88 of the braking member 80, the releasing projection 104 enters into the through hole 55 of the reel 40 and fits-together therewith. In this way, the braking member 80 is pushed upward against the urging force of the compression coil spring 78 (moves to a rotation permitting position relative to the reel 40), such that the state in which rotation of the reel 40 is locked by the braking member 80 is cancelled.

Accompanying this upward movement of the braking member 80, the taper surfaces 86A of the engaging projections 86 of the braking member 80 and the taper surfaces 94A of the cam portions 94 of the locking members 90, while sliding along one another, convert the upward moving force of the braking member 80 into moving force of the locking members 90 toward the radial direction inner side. In this way, the locking members 90 move from the restricting positions toward the restriction releasing positions.

When the rotating shaft 100 moves further upward, while the rotating shaft 100 pushes the braking member 80 further upward, the driving gear 102 meshes with the reel gear 50. In this way, before the lower end surface of the reference convex portion 48 of the reel 40 abuts the positioning surface 108 of the rotating shaft 100, the lock portions 93 of the locking members 90 are completely pulled-out from the gap G. When the positioning surface 108 of the rotating shaft 100 abuts the lower end surface of the reference convex portion 48 of the reel 40, the rotating shaft 100 moves further upward together with the reel 40 and the braking member 80.

Then, when the bucket moves downward by a set stroke and stops, movement of the rotating shaft 100 with respect to the case 12 stops. As shown in FIG. 3, in the axial direction of the reel 40, the lower end surface of the reference convex portion 48 thereof abuts the positioning surface 108, and the reel 40 is positioned at a rotatable position at which it is raised up within the case 12. In this state, the reel 40 is held at the rotating shaft 100 due to the attraction force by which the magnet 106 attracts the reel plate 52.

In this state, the braking member 80, whose operation projection 88 is abutting the releasing projection 104, is held at the rotation permitting position (the absolute rotation permitting position with respect to the case 12). Further, due to the releasing projection 104 fitting-together with the through hole 55 as described above, the reel 40 is centered with respect to the rotating shaft 100. The respective locking members 90 position the cam portions 94 thereof at the inner sides of the corresponding engaging projections 86 of the braking member 80 which is held at the aforementioned rotation permitting position (i.e., the locking members 90 are positioned at the absolute restriction releasing positions with respect to the case 12), such that movement of the locking members 90 toward the radial direction outer side, i.e., toward the restricting positions, is reliably impeded.

Then, an unillustrated pull-out member of the drive device approaches the opening 20 from the left side wall 12B side, and engages with the hole 22A of the leader tape 22. At this time, because the leader tape 22 is standing-by in a state of being adjacent to the left side wall 12B, the pull-out member can reliably engage the hole 22A. The pull-out member, which is engaging the hole 22A, moves away from the opening 20, pulls the leader tape 22 out from the case 12, and engages the leader tape 22 with an unillustrated take-up reel of the drive device such that the leader tape 22 can be taken-up thereon.

From this state, the drive device rotates and drives the take-up reel and the rotating shaft 100, i.e., the reel 40, to rotate synchronously. In this way, the magnetic tape T is successively fed out to the drive device. Then, recording of data onto the magnetic tape T or playback of data recorded on the magnetic tape T is carried out by a recording/playback head (not illustrated) which is disposed along a predetermined tape path of the drive device.

When the recording tape cartridge 10 is to be removed from the drive device, first, the driving gear 102 and the rotating shaft 100, i.e., the reel 40, are rotated reversely, and the magnetic tape T is rewound onto the reel 40. Then, the leader tape 22 is disconnected from the take-up reel and is returned to the interior of the case 12 from the opening 20. Namely, the jutting portions 22B of the leader tape 22 are accommodated (inserted) in the slot portions 24, and are held at predetermined positions within the case 12.

Next, the drive device raises the bucket, i.e., the recording tape cartridge 10. Thus, the meshed-together state of the reel gear 50 and the driving gear 102 is cancelled, the releasing projection 104 withdraws from the through hole 55, the abutment of the operation projection 88 and the releasing projection 104 is cancelled, and the braking member 80 returns, due to the urging force of the compression coil spring 78, to its rotation locking position at which the case side gear 82 meshes together with the reel side gear 54. At this time, due to the urging force of the compression coil spring 78, the reel 40 also moves downward and returns to its lowermost position. Further, due to the braking member 80 returning to the rotation locking position, the respective locking members 90 can move toward the radial direction outer side, and, due to the urging force of the compression coil spring 56, return to their restricting positions at which the lock portions 93 are disposed in the gap G.

In this state, the recording tape cartridge 10 is discharged from the bucket. Due to this discharging operation, the engaged state of the opening/closing member of the drive device and the door 30 is cancelled, and, due to the urging force of the torsion spring 28, the door 30 returns to the position of closing the opening 20. Accordingly, the recording tape cartridge 10 which is discharged from the bucket of the drive device is returned to its initial state in which the opening 20 is closed and rotation of and upward and downward movement of the reel are impeded.

Meanwhile, when the recording tape cartridge 10 falls to a floor or the like, the reel 40 may be inclined with respect to the case 12 inside the case 12 against the urging force of the compression coil spring 78 due to the falling impact. In this case, the brake member 80 is pushed up toward the ceiling plate 14A against the urging force of the compression coil spring 78, by the reel 40 inclined to the case 12 as described above, while the posture of the brake member 80 with respect to the case 12 is maintained by the engagement of the guide walls 68 and the respective engaging protrusions 86.

In this case, in the recording tape cartridge 10, in the non-utilization state, between the ceiling plate 14A and the reel 40 deviated to the side of the bottom plate 16A in the case 12, the locking portion 93 of the locking member 90 is entered to restrict the relative displacement in the axis direction of the reel 40 and the case 12 between the ceiling plate 14A of the case 12 and the reel 40. So, even when the recording tape cartridge 10 falls, the inclination of the reel 40 with respect to the case 12 is suppressed. For this reason, the relative inclination amount of the brake member 80 and the reel 40 where the posture variation (inclination) with respect to the case 12 is restricted by the engagement of the guide walls 68 and the guide pieces 84 is also restricted.

Further, in the recording tape cartridge 10, the mesh release stroke S that releases the mesh of the case side gear 82 with respect to the reel side gear 54 is larger than the maximum displacement Zmax1 of the reel side gear 54 (the gear train 111) of when the reel 40 is most inclined with respect to the case 12. Therefore, when the relative inclination occurs between the reel 40 and the brake member 80 due to the falling or the like as shown in FIG. 10, the mesh of the reel side gear 54 and the case side gear 82 is maintained with respect to all of the piece taper teeth 112 and the piece taper teeth 114 and all of the inverse piece taper teeth 116 and the inverse piece taper teeth 120 over the circumferential direction. For this reason, even though the follow-up delay of the brake member 80 with respect to the motion of the reel 40 occurs, the mesh of the reel side gear 54 and the case side gear 82 is maintained over almost the entire circumference, and the rotation lock state of the reel 40 with respect to the case 12 is maintained.

Further, the brake member 80 is sufficiently light weight as compared with the reel 40 where the magnetic tape T is wound. It does not occur that the brake member 80 is displaced exceeding the mesh release stroke S against the urging force of the compression coil spring 78 (including a case of exceeding the mesh release stroke at a portion of the circumferential direction) at the assumed falling impact, and the brake member 80 is independently displaced in the reel axis direction or inclined with respect to the reel 40. Accordingly, as described above, by the inclination of the reel 40 with respect to the case 12 being restricted by the locking member 90, it is possible to maintain the mesh in the reel side gear 54 of the case side gear 82.

As such, in the recording tape cartridge 10 according to the first embodiment of the present invention, it is possible to prevent the rotation lock of the reel 40 with respect to the case 12 from being released in accordance with the falling.

Meanwhile, if the leader tape 22 where the jetting portion 22B is inserted into the slot portion 24 and held with respect to the case 12 is pulled out toward the inner side of the case from the holding state, the jetting portion 22B may be deformed while interfering with the stopper wall of the slot portion 24, and may override the stopper portion. In this case, since the proper holding of the leader tape 22 with respect to the case 12 is cancelled, it becomes difficult to draw the magnetic tape T by the drive device thereafter.

Here, in the recording tape cartridge 10, as described, it is possible to prevent the rotation of the reel 40 with respect to the case 12 when the falling as described above. Therefore, the canceling of the holding state of the leader tape 22 with respect to the case 12 due to the leader tape 22 being pulled out toward the inner side of the case can be prevented or effectively suppressed.

In addition, in the recording tape cartridge 10, the first mesh surface 112A of the piece taper tooth 112 that constitutes the gear train 111 of the reel side gear 54 is approximately parallel to the reel axis direction and is meshed with the first mesh surface 114A that is approximately parallel to the reel axis direction at the side of the brake member 80 (the case 12). Therefore, the rotation force of the reel 40 in the direction shown by the arrow R1 can be prevented or significantly suppressed from being converted into the thrust force of the mesh releasing direction of the piece taper tooth 112 (the reel side gear 54) and the piece taper tooth 114 (the case side gear 82). That is, generated thrust force may be very small if generated. For this reason, for example, when the rotation force of the direction shown by the arrow R1 is applied to the reel 40 due to the falling impact, the rotation is blocked by the mesh of the piece taper teeth 112 and the piece taper teeth 114, further, the relative displacement in the axis direction of the reel 40 with respect to the case 12 is prevented.

Further, in the recording tape cartridge 10, the second mesh surface 112B of the piece taper tooth 112 and the second mesh surface 114B of the piece taper tooth 114 are the taper surfaces that are inclined with respect to the reel axis line. Therefore, in accordance with the relative movement in the reel axis direction of the brake member 80 with respect to the reel 40, the piece taper teeth 112 and the piece taper teeth 114 are guided (invited) in the circumferential direction by the second mesh surfaces 112B and 114B and are smoothly meshed.

In this case, in the recording tape cartridge 10, since the piece taper tooth 112 and the piece taper tooth 114 have the piece taper shape, it is possible to achieve both a function of enabling the thrust force of the mesh releasing direction not to be generated for the direction shown by the arrow R1 and a function of setting a wide range (overall height in this embodiment) in the reel axis direction in the second mesh surfaces 112B and 114B as the taper surface for guiding so ensuring the meshing ability.

Here, since the recording tape cartridge 10 has the gear trains 118 and 122 that include the inverse piece taper teeth 116 and 120 having opposite orientation to the gear trains 111 and 115, even when the rotation force of the reel 40 is applied in the direction shown by the arrow R2, the thrust force of the direction that releases the mesh of the reel side gear 54 and the case side gear 82 can be prevented or significantly suppressed from being generated by the rotation force. Meanwhile, the meshing ability of the case side gear 82 and the reel side gear 54 is secured by the guiding by the second mesh surface 112B and the second mesh surface 114B and the guiding by the second mesh surface 116B and the second mesh surface 120B.

Second Embodiment

Figure 11:
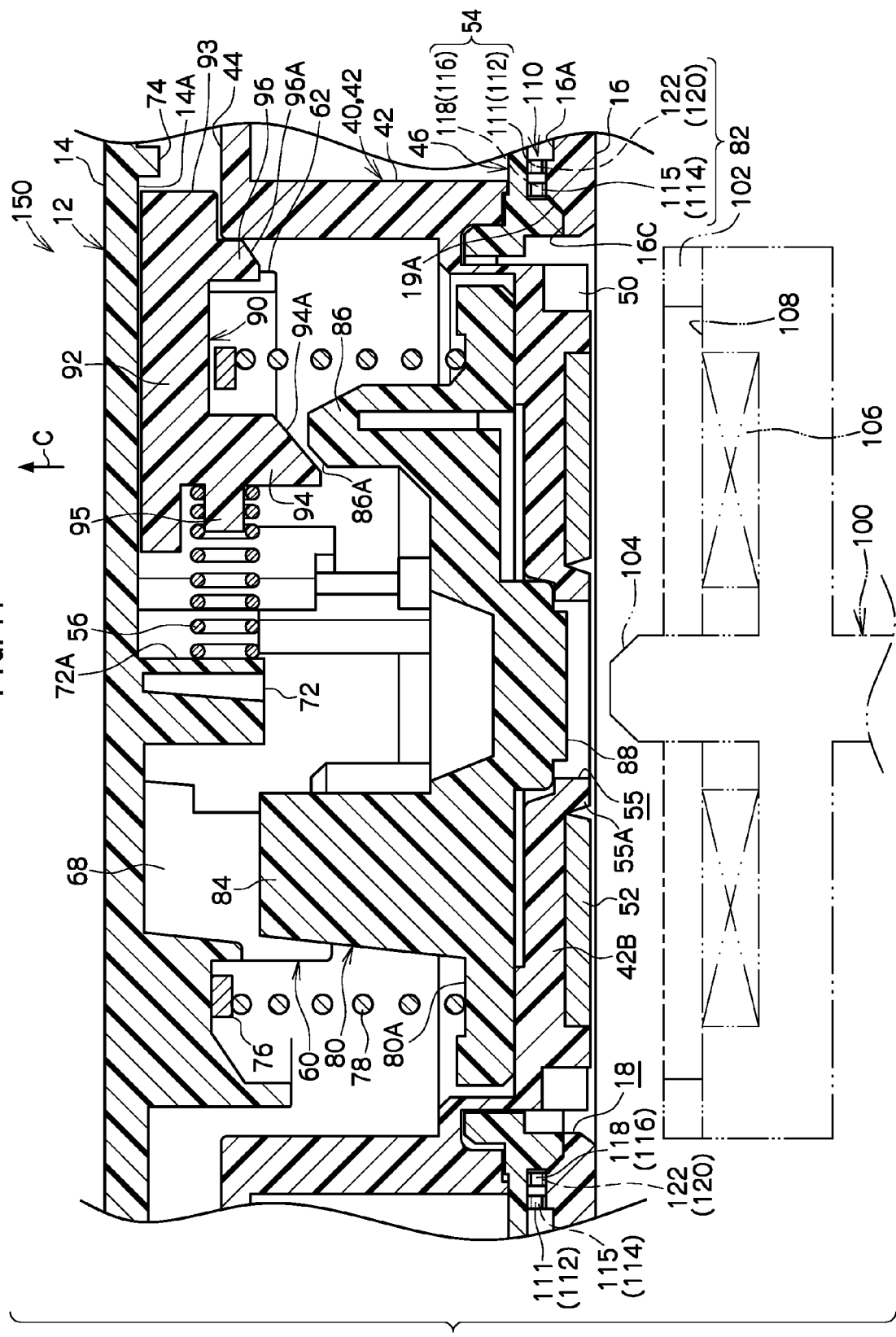
FIG. 11 is an enlarged lateral cross-sectional view illustrating a non-utilization state of a recording tape cartridge according to a second embodiment of the present invention.
Figure 12:
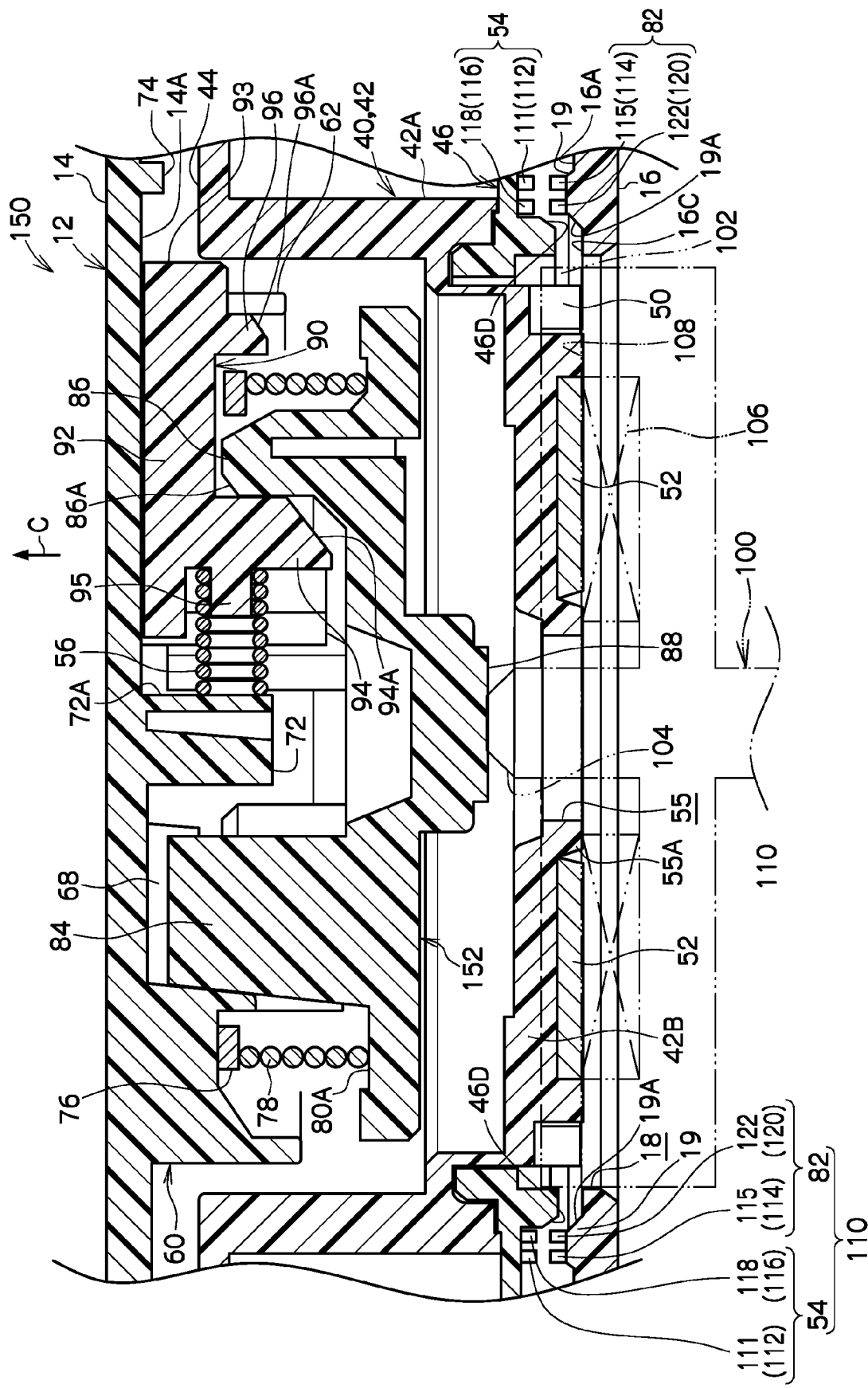
FIG. 12 is an enlarged later cross-sectional view illustrating a reel rotation state of a recording tape cartridge according to a second embodiment of the present invention.

FIGS. 11 and 12 are enlarged cross-sectional views of a portion of a recording tape cartridge 150 according to a second exemplary embodiment. As shown in FIGS. 11 and 12, the recording tape cartridge 150 is different from the recording tape cartridge 10 in that the case side gear 82 is provided in the case 12, instead of providing the case side gear 82 in the brake member 80.

Specifically, the case side gear 82 has configuration where the gear trains 115 and 122 are coaxially disposed in the inner and outer circumferential portions of the annular rib 19 in the bottom plate 16A of the lower case 16 constituting the case 12. The reel side gear 54 meshing with the case side gear 82 is provided at a boundary portion of the annular rib 46C in the lower flange 46A of the lower flange member 46 constituting the reel 40 or in the vicinity of the boundary portion. In the recording tape cartridge 150, when the reel 40 is disposed at the lowest position by the urging force of the compression coil spring 78, the reel side gear 54 and the case side gear 82 are meshed with each other. As result, the rotation of the reel 40 with respect to the case 12 is locked, and the reel 40 is displaced at the raised position by the rotation shaft 100, thereby releasing the rotation lock of the reel 40 with respect to the case 12. In this configuration, the taper surface 46D of the reel 40 and the taper surface 19A of the annular rib 19 correspond to the taper portion in the present invention.

The recording tape cartridge 150 has, instead of the brake member 80, a lock releasing member 152 that has the same configuration as the brake member 80, except that the case side gear 82 is not provided. By the lock releasing member 152, the locking member 90 moves from the regulation position to the regulation release position. The other configuration of the recording tape cartridge 150 is the same as the configuration that corresponds to the recording tape cartridge 10.

Accordingly, even in the recording tape cartridge 150 according to the second embodiment, the same effect can be obtained by the same operation as that of the recording tape cartridge 10 according to the first embodiment.

Figure 13:
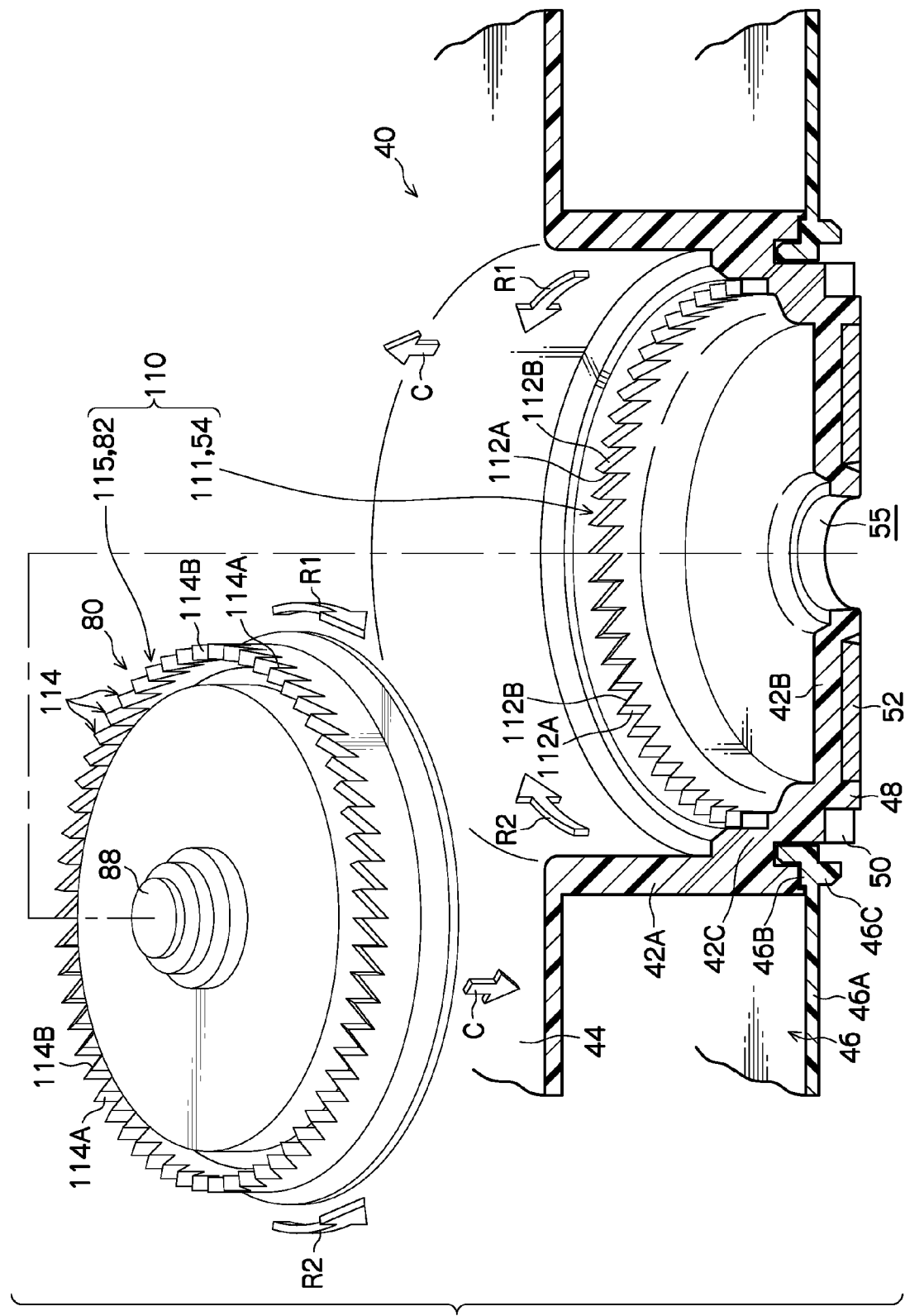
FIG. 13 is a partially cut perspective view illustrating a modification of a reel locking section that constitutes a recording tape cartridge according to an embodiment of the present invention.

In the above-described embodiments, the reel side gear 54 that constitutes the reel 40 has the gear trains 111 and 118 and the brake member 80 (the case 12) has the gear trains 115 and 122, but the present invention is not limited thereto. For example, as shown in FIG. 13, the reel side gear 54 that constitutes the reel 40 may have only the gear train 111 (teeth group having the first mesh surface 112A and the second mesh surface 112B) and the case side gear 82 at the side of the case 12 may have only the gear train 115 (teeth group having the first mesh surface 114A and the second mesh surface 114B). In this configuration, the rotation of the reel in the direction shown by the arrow R1 (the winding direction of the magnetic tape T) is prohibited by the mesh of the first mesh surfaces 112A and 114A substantially parallel to the reel axis line without generating thrust force of the mesh releasing direction.

Further, in the above-described embodiments, the case where the gear trains 111 and 118 and the gear trains 115 and 122 are formed in an annular shape has been exemplified, but the present invention is not limited thereto. For example, in the configuration where the gear train 111 is formed in an annular shape, the gear train 115 may partially have the piece taper teeth 114 in the circumferential direction, and in the configuration where the gear train 115 is formed in an annular shape, the gear train 111 may partially have the piece taper teeth 112 in the circumferential direction. In the same way, in the configuration where the gear train 118 is formed in an annular shape, the gear train 122 may partially have the inverse piece taper teeth 120 in the circumferential direction, and in the configuration where the gear train 122 is formed in an annular shape, the gear train 118 may partially have the inverse piece tape teeth 116 in the circumferential direction.

Further, in the above-described embodiments, the case where the gear trains 111 and 115 are disposed at the outer circumferential side with respect to the gear trains 118 and 122 has been exemplified, but the present invention is not limited thereto. The arrangement of the gear trains (the inner circumferential side/the outer circumferential side) may be changed. Further, in the above-described embodiments, the case where the mesh release strokes S are substantially the same in the gear trains 111 and 115 and the gear trains 118 and 122 has been exemplified, but the present invention is not limited thereto. For example, the mesh release strokes S may be different form each other.

Further, in the above-described embodiments, the case where the recording tape cartridges 10 and 150 include the locking member 90 has been exemplified, but the present invention is not limited thereto. For example, the reel locking mechanism 110 may be applied to the recording tape cartridge that does not include the locking member 90. In this case, even though the rotation force of the direction shown by the arrow R1 is applied to the reel 40 when the recording tape cartridge falls, the rotation force is blocked in the case 12 by the mesh of the first mesh surfaces 112A and 114A that are approximately parallel to the reel axis line, and the generation of the thrust force in the mesh releasing direction is prevented or significantly suppressed. Therefore, the mesh of the reel side gear 54 and the case side gear 82 is maintained. Accordingly, it is prevented or effectively suppressed that, due to the rotation force of the winding rotation direction that is applied to the reel 40, the mesh state of the reel side gear 54 and the case side gear 82 is released, and, due to the leader tape 22 being pulled out toward the inner side of the case, the holding state of the leader tape 22 with respect to the case 12 is cancelled.

Further, in the above-described embodiments, the case where the guide structure 128 is formed between the annular rib 46C of the rib 40 and the outer circumferential portion of the brake member 80 has been described, but the present invention is not limited thereto. For example, the guide structure 128 may be formed between the gear trains 111 and the gear trains 115 by the shapes of the piece taper teeth 112 and 114. The guide structure 128 may be formed between the gear trains 118 and 122 by the shapes of the inverse piece taper teeth 116 and 120.

Further, in the above-described each embodiment, the case where the reel side gear 54 is formed integrally with the reel hub 42 has been exemplified, but the present invention is not limited thereto. For example, the reel side gear 54 may be formed in a ring-shaped member that is a member separated from the reel hub 42 and it may be mounted in the cylindrical portion 42A of the reel 40. In this case, as the ring-shaped member, a reinforcing ring having high rigidity (metal, fiber reinforcing resin or the like) that reinforces the cylindrical portion 42A of the reel 40 in the radial direction may be used. In the same way, the brake gear 82 that is configured as a member separated from the brake member 80 or the case 12 may be mounted in the brake member 80 or the case 12.

In the above-described each embodiment, the upper flange 44 is provided integrally with the reel hub 42. However, the present invention is not limited to the same, and may be structured such that, for example, the lower flange 46A is formed integrally with the reel hub 42, and the upper flange 44 is fixed to the top end surface of the cylindrical tube portion 42A by ultrasonic welding or the like. In this case, the lock portions 93 of the locking members 90 which are positioned at the restricting positions are disposed so as to abut the portion of the upper flange which portion is further toward the radial direction inner side than the outer peripheral surface of the cylindrical tube portion 42A. Accordingly, it suffices to provide a tubular portion, which fits into the cylindrical tube portion 42A, at the upper flange which is formed as a member separate from the reel hub 42.

Still further, the above each embodiment is structured such that the locking members 90 can be set at their restricting positions and restriction releasing positions by moving in the radial direction of the reel 40. However, the present invention is not limited to the same. For example, the locking members 90 may be structured so as to assume their restricting positions and restriction releasing positions by moving in a direction intersecting the radial direction of the reel 40. Or, the locking members 90 may be structured so as to be able to be set at their restricting positions and restriction releasing positions by rotating around predetermined supporting points.

Moreover, the above-described each embodiment is an example in which the opening 20 provided at the corner portion 12C of the case 12 is opened and closed by a hinge-type door 30, and the leader tape 22 serving as the leader member is connected to the distal end of the magnetic tape T.

However, the present invention is, of course, not limited by the opening for the pulling-out of the magnetic tape T at the case 12, the covering member for opening and closing the opening, and the structure of the leader member.

In addition, the above-described each embodiment is structured such that the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

Further, in the above-described embodiments, the case where the rotation locking mechanism according to the embodiment of the present invention is applied to the recording tape cartridges 10 and 150 has been exemplified, but the present invention is not limited thereto. The present invention may be applied to various rotation locking mechanisms. Accordingly, the present invention may be applied to the recording media cartridges that accommodate the disc-shaped recording media.

What is claimed is:

1. A recording tape cartridge comprising:
  a reel around which a recording tape is wound;
  a case in which the reel is accommodated such that the reel is rotatable around a reel axis line;
  a reel side gear provided in the reel, that is configured to include a plurality of piece taper teeth, in each of which a first mesh surface oriented in a rotation direction of the reel when the recording tape is wound is substantially parallel to the reel axis line direction and a second mesh surface oriented in a rotation direction of the reel when the recording tape is pulled out is inclined with respect to the reel axis line direction, the plurality of piece taper teeth of the reel side gear being arranged in the reel along a circumference which is coaxial with the reel;
  a case side gear provided in a brake member which is supported so as not to be able to rotate with respect to the case, that is configured to include a plurality of piece taper teeth formed to be able to mesh with the piece taper teeth of the reel side gear, the plurality of piece taper teeth of the case side gear being arranged in the brake member along a circumference which is coaxial with the reel, and a mesh state of the reel side gear and the case side gear and a mesh release state of the reel side gear and the case side gear being able to be acquired by the brake member and the reel being relatively moved in the reel axis line direction; and
  a mesh holding section that maintains the mesh state of the reel side gear and the case side gear when the recording tape is not in use;
  wherein each of the plurality of piece taper teeth of the case side gear is configured such that a first mesh surface oriented in the rotation direction of the reel when the recording tape is pulled out is substantially parallel to the reel axis line direction and a second mesh surface oriented in the rotation direction of the reel when the recording tape is wound is inclined with respect to the reel axis line direction, and
  wherein, when the case side gear and the reel side gear are in an engaged state and the reel rotates in a particular direction, the first mesh surfaces of the plurality of piece taper teeth of the case side gear mesh with the first mesh surfaces of the plurality of piece taper teeth of the reel side gear, and the second mesh surfaces of the plurality of piece taper teeth of the case side gear do not mesh with the second mesh surfaces of the plurality of piece taper teeth of the reel side gear.

2. The recording tape cartridge of claim 1, wherein
  the reel side gear further includes a plurality of inverse piece taper teeth, in each of which a first mesh surface oriented in the rotation direction of the reel when the recording tape is pulled out is substantially parallel to the reel axis line direction and a second mesh surface oriented in the rotation direction of the reel when the recording tape is wound is inclined with respect to the reel axis line direction, the plurality of inverse piece taper teeth of the reel side gear being arranged in the reel along a circumference which is coaxial with the reel, the case side gear further includes a plurality of inverse piece taper teeth that is formed to be able to mesh with the inverse piece taper teeth of the reel side gear and arranged in the case or the brake member along a circumference which is coaxial with the reel, and
  in the mesh state, the piece taper teeth of the case side gear and the inverse piece taper teeth of the case side gear, and the piece taper teeth of the reel side gear and the inverse piece taper teeth of the reel side gear are respectively meshed with each other, and in the mesh release state, the meshing states of the piece taper teeth of the case side gear and the inverse piece taper teeth of the case side gear, and the piece taper teeth of the reel side gear and the inverse piece taper teeth of the reel side gear are respectively released.

3. The recording tape cartridge of claim 2, wherein in at least one of the reel and the case or the brake member, a taper portion is provided for centering the reel side gear with respect to the case side gear in accordance with relative movement of the reel and the brake member in a direction in which the case side gear and the reel side gear are meshed with each other.

4. The recording tape cartridge of claim 2, further comprising a locking member that is entered between the case and the reel to regulate movement of the reel with respect to the case in the axis line direction when the recording tape is not in use.

5. The recording tape cartridge of claim 2, further comprising:
  a leader tape to one end of which a tip end of the recording tape is connected, and at the other end of which an operated portion, that is operated to be pulled out by a drive device for the recording tape cartridge when the recording tape is pulled out from an opening of the case, is provided within a range of a width of the recording tape;
  convex portions that extend outwardly in width-wise directions of the leader tape from the other end of the leader tape; and
  a slot portion that includes: a groove portion provided in the case to face the opening, in which the convex portions are entered slidably in the pull out direction of the recording tape with respect to the case; and a stopper portion which closes an inner side end of the case in the groove portion.

6. The recording tape cartridge of claim 2, wherein each of the plurality of inverse piece taper teeth of the case side gear is configured such that a first mesh surface oriented in the rotation direction of the reel when the recording tape is wound is substantially parallel to the reel axis line direction and a second mesh surface oriented in the rotation direction of the reel when the recording tape is pulled out is inclined with respect to the reel axis line direction.

7. The recording tape cartridge of claim 6, wherein the first mesh surface and the second mesh surface of the plurality of inverse piece taper teeth of the case side gear can be respectively meshed with the first mesh surface and the second mesh surface of the plurality of inverse piece taper teeth of the reel side gear.

8. The recording tape cartridge of claim 1, wherein in at least one of the reel or the case or the brake member, a taper portion is provided for centering the reel side gear with respect to the case side gear in accordance with relative movement of the reel and the brake member in a direction in which the case side gear and the reel side gear are meshed with each other.

9. The recording tape cartridge of claim 1, further comprising a locking member that is entered between the case and the reel to regulate movement of the reel with respect to the case in the axis line direction when the recording tape is not in use.

10. The recording tape cartridge of claim 1, further comprising:
a leader tape to one end of which a tip end of the recording tape is connected, and at the other end of which an operated portion, that is operated to be pulled out by a drive device for the recording tape cartridge when the recording tape is pulled out from an opening of the case, is provided within a range of a width of the recording tape;
convex portions that extend outwardly in width-wise directions of the leader tape from the other end of the leader tape; and
a slot portion that includes: a groove portion provided in the case to face the opening, in which the convex portions are entered slidably in the pull out direction of the recording tape with respect to the case; and a stopper portion which closes an inner side end of the case in the groove portion.

11. A rotation locking structure comprising:
a base portion;
a rotation body that is supported at the base portion to be rotatable around an axis line;
a rotation body side gear provided at the rotation body, that is configured to include a plurality of piece taper teeth, in each of which a first mesh surface oriented in one rotation direction of the rotation body around the axis line is substantially parallel to the axis line direction and a second mesh surface oriented in the other rotation direction of the rotation body around the axis line is inclined with respect to the axis line direction, the plurality of piece taper teeth of the rotation body side gear being arranged at the rotation body along a circumference which is coaxial with the rotation body; and
a base side gear provided in a brake member which is supported so as not to be able to rotate with respect to the base portion, that is configured to include a plurality of piece taper teeth formed to be able to mesh with the plurality of piece taper teeth of the rotation body side gear, a mesh state of the rotation body side gear and the base side gear and a mesh release state of the rotation body side gear and the base side gear being able to be acquired by the brake member and the rotation body being relatively moved in the axis line direction;
wherein each of the plurality of piece taper teeth of the base side gear is configured such that a first mesh surface oriented in the rotation direction of the rotation body when the recording tape is pulled out is substantially parallel to the axis line direction and a second mesh surface oriented in the rotation direction of the rotation body when the recording tape is wound is inclined with respect to the axis line direction, and
wherein, when the base side gear and the rotation body side gear are in an engaged state and the rotation body rotates in a particular direction, the first mesh surfaces of the plurality of piece taper teeth of the base side gear mesh with the first mesh surfaces of the plurality of piece taper teeth of the rotation body side gear, and the second mesh surfaces of the plurality of piece taper teeth of the base side gear do not mesh with the second mesh surfaces of the plurality of piece taper teeth of the rotation body side gear.

12. The rotation locking structure of claim 11, wherein
the rotation body side gear further includes a plurality of inverse piece taper teeth, in each of which a first mesh surface oriented in the other rotation direction of the rotation body around the axis line is substantially parallel to the axis line direction and a second mesh surface oriented in the one rotation direction of the rotation body around the axis line is inclined with respect to the axis line direction, the plurality of inverse piece taper teeth of the rotation body side gear being arranged in the rotation body along a circumference which is coaxial with the rotation body and whose diameter is different from that of the circumference of the piece taper teeth of the rotation body side gear,
the base side gear further includes a plurality of inverse piece taper teeth formed to be able to mesh with the inverse piece taper teeth of the rotation body side gear, and
in the mesh state, the piece taper teeth of the base side gear and the inverse piece taper teeth of the base side gear, and the piece taper teeth of the rotation body side gear and the inverse piece taper teeth of the rotation body side gear are respectively meshed with each other, and in the mesh release state, the meshing states of the piece taper teeth of the base side gear and the inverse piece taper teeth of the base side gear, and the piece taper teeth of the rotation body side gear and the inverse piece taper teeth of the rotation body side gear are respectively released.

13. A recording tape cartridge comprising:
a reel around which a recording tape is wound;
a case in which the reel is accommodated such that the reel is rotatable around a reel axis line;
a reel side gear provided in the reel, that is configured to include a plurality of piece taper teeth, in each of which a first mesh surface oriented in a rotation direction of the reel when the recording tape is wound is substantially parallel to the reel axis line direction and a second mesh surface oriented in a rotation direction of the reel when the recording tape is pulled out is inclined with respect to the reel axis line direction, the plurality of piece taper teeth of the reel side gear being arranged in the reel along a circumference which is coaxial with the reel;
a case side gear provided in the case, that is configured to include a plurality of piece taper teeth formed to be able to mesh with the piece taper teeth of the reel side gear, the plurality of piece taper teeth of the case side gear being arranged in the case along a circumference which is coaxial with the reel, and a mesh state of the reel side gear and the case side gear and a mesh release state of the reel side gear and the case side gear being able to be acquired by the case and the reel being relatively moved in the reel axis line direction; and
a mesh holding section that maintains the mesh state of the reel side gear and the case side gear when the recording tape is not in use;

wherein each of the plurality of piece taper teeth of the case side gear is configured such that a first mesh surface oriented in the rotation direction of the reel when the recording tape is pulled out is substantially parallel to the reel axis line direction and a second mesh surface oriented in the rotation direction of the reel when the recording tape is wound is inclined with respect to the reel axis line direction, and wherein, when the case side gear and the reel side gear are in an engaged state and the reel rotates in a particular direction, the first mesh surfaces of the plurality of piece taper teeth of the case side gear mesh with the first mesh surfaces of the plurality of piece taper teeth of the reel side gear, and the second mesh surfaces of the plurality of piece taper teeth of the case side gear do not mesh with the second mesh surfaces of the plurality of piece taper teeth of the reel side gear.

14. A rotation locking structure comprising:

a base portion;

a rotation body that is supported at the base portion to be rotatable around an axis line;

a rotation body side gear provided at the rotation body, that is configured to include a plurality of piece taper teeth, in each of which a first mesh surface oriented in one rotation direction of the rotation body around the axis line is substantially parallel to the axis line direction and a second mesh surface oriented in the other rotation direction of the rotation body around the axis line is inclined with respect to the axis line direction, the plurality of piece taper teeth of the rotation body side gear being arranged at the rotation body along a circumference which is coaxial with the rotation body; and a base side gear provided in the base portion, that is configured to include a plurality of piece taper teeth formed to be able to mesh with the plurality of piece taper teeth of the rotation body side gear, a mesh state of the rotation body side gear and the base side gear and a mesh release state of the rotation body side gear and the base side gear being able to be acquired by the base portion and the rotation body being relatively moved in the axis line direction;

wherein each of the plurality of piece taper teeth of the base side gear is configured such that a first mesh surface oriented in the rotation direction of the rotation body when the recording tape is pulled out is substantially parallel to the axis line direction and a second mesh surface oriented in the rotation direction of the rotation body when the recording tape is wound is inclined with respect to the axis line direction, and wherein, when the base side gear and the rotation body side gear are in an engaged state and the rotation body rotates in a particular direction, the first mesh surfaces of the plurality of piece taper teeth of the base side gear mesh with the first mesh surfaces of the plurality of piece taper teeth of the rotation body side gear, and the second mesh surfaces of the plurality of piece taper teeth of the base side gear do not mesh with the second mesh surfaces of the plurality of piece taper teeth of the rotation body side gear.

* * * * *